United States Patent [19]

Umekita et al.

[11] Patent Number: 5,452,461
[45] Date of Patent: Sep. 19, 1995

[54] PROGRAM PARALLELIZING APPARATUS CAPABLE OF OPTIMIZING PROCESSING TIME

[75] Inventors: Kazuhiro Umekita, Ibaraki; Masatsugu Kametani, Tsuchiura, both of Japan

[73] Assignee: Hitachi, Ltd., Tokyo, Japan

[21] Appl. No.: 161,100

[22] Filed: Dec. 3, 1993

Related U.S. Application Data

[63] Continuation of Ser. No. 513,934, Apr. 24, 1990, abandoned.

[30] Foreign Application Priority Data

Apr. 28, 1989 [JP] Japan ................................ 1-107654

[51] Int. Cl.⁶ ............................................. G06F 9/45
[52] U.S. Cl. ............................. 395/700; 364/280.4; 364/280.5; 364/DIG. 1
[58] Field of Search ................. 395/700; 364/280.4, 364/280.5

[56] References Cited

U.S. PATENT DOCUMENTS

| | | | |
|---|---|---|---|
| 3,702,005 | 10/1972 | Ingalls, Jr. | 444/1 |
| 4,636,948 | 1/1987 | Gdaniec et al. | 395/650 |
| 4,843,540 | 6/1989 | Stolfo | 395/700 |
| 4,853,872 | 8/1989 | Shimoi | 395/700 |
| 5,088,034 | 2/1992 | Ihara et al. | 395/700 |
| 5,093,916 | 3/1992 | Karp et al. | 395/700 |
| 5,151,991 | 9/1992 | Iwasawa et al. | 395/700 |

FOREIGN PATENT DOCUMENTS

| | | | |
|---|---|---|---|
| 63-154057 | 12/1985 | Japan | G06F 15/16 |
| 63-45670 | 8/1986 | Japan | G06F 15/16 |
| 63-47866 | 8/1986 | Japan | G06F 15/16 |
| 63-101957 | 10/1986 | Japan | G06F 15/16 |
| 63-184841 | 10/1987 | Japan | G06F 9/46 |

OTHER PUBLICATIONS

Iversen, "A Speed Hike for Parallel Supercomputing", Electronics, vol. 16 No. 17, 1988 pp. 121 and 124.
Guthery, "Self-timing Programs and the Quantum Scheduler", Comm of the ACM, vol. 31 No. 6, Jun. 1988, pp. 696–702.
Cytron, "Limited Processor Scheduling of Doacross Loops", Proceedings of the 1987 Int. Conf. on Parallel Processing, Aug. 1987, pp. 226–234.
Gupta, "The Fuzzy Barrier: A Mechanism for High Speed Synchronization of Processors", Computer Architecture News, vol. 17 No. 2 Apr. 1989, pp. 54–63.
Wolfe, "Multiprocessor Synchronization for Concurrent Loops", IEEE Software, vol. 5 No. 1 Jan. 1988. 34–42.
Cytron et al., "What's in a Name?", Proceedings of the 1987 Int. Conf. on Parallel Proc., Aug. 1987, pp. 19–27.
Manuel, "Parallel Compilers Are Coming Just In Time", Electronics, vol. 61 No. 17, Nov. 1988, pp. 117 and 120.
Ryder et al., Experiments in Optimizing FP, IEEE Trans. on Software Engineering, vol. 14, No. 4, Apr. 1988, pp. 444–454.
Joseph Fisher, Trace Scheduling: A Technique for Global Microcode Compaction, IEEE Trans. on Computers, vol. 30, No. 7, Jul. 1981, pp. 478–490.
Kuck et al., Measurements of Parallelism in Ordinary FORTRAn Programs, Computer, 1974, pp. 37–46.

*Primary Examiner*—Kevin A. Kriess
*Assistant Examiner*—Dennis M. Butler
*Attorney, Agent, or Firm*—Antonelli, Terry, Stout & Kraus

[57] ABSTRACT

A program parallelizing apparatus for generating from a source program to be executed an object program which is capable of being processed in parallel by a plurality of processors constituting a multi-processor which includes a communication mechanism for allowing inter-processor communication and a synchronization mechanism for allowing the processings to proceed in parallel among the processor through coordination. Object programs susceptible to parallel processing by the multi-processor system with high efficiency can be generated at a high speed in correspondence to various source programs universally independent of the types of processors.

9 Claims, 19 Drawing Sheets

FIG. 2

$a = b + c$        $T_1 = a = b + c$ $a = a + 1$   ⟹   $T_2 = e = T_1 + 1$ $d = a \times 2$        $T_3 = d = T_2 \times 2$

⋮               ⋮

SOURCE PROGRAM        PROGRAM IN FUNCTION FORM
(NON-FUNCTION FORM)

FIG. 3

TASK REGISTRATION TABLE

| TASK NO. | TASK CONTENTS (VIRTUAL MACHINE CODES) | TASK PROCESSING TIME |
|---|---|---|
| 1 | OP. 1 | 4 |
| 2 | OP. 2 | 2 |
| 3 | OP. 3 | 6 |
| ⋮ | ⋮ | ⋮ |

FIG. 4

| VIRTUAL MACHINE CODES | PROCESSOR A | | PROCESSOR B | |
|---|---|---|---|---|
| | REAL MACHINE CODE | PROCESSING TIME | REAL MACHINE CODE | PROCESSING TIME |
| OP. 1 | AOP. 1 | 4 | BOP. 1 | 5 |
| OP. 2 | AOP. 2 | 2 | BOP. 2 | 3 |
| OP. 3 | AOP. 3 | 6 | BOP. 3 | 7 |
| ⋮ | ⋮ | ⋮ | ⋮ | ⋮ |

| TASK NO. | ASCENDENT TASK |
|---|---|
| 1 | 0 |
| 2 | 0 |
| 3 | 0 |
| 4 | 0 |
| 5 | 2 |
| 6 | 3,4 |
| 7 | 3,4 |
| 8 | 6,7 |
| 9 | 6,7 |
| 10 | 1,5,8 |
| 11 | 5,8,9 |

| LEVEL NO. | TASK NO. |
|---|---|
| 1 | 1, 2, 3, 4 |
| 2 | 5, 6, 7 |
| 3 | 8, 9 |
| 4 | 10, 11 |

PROCESSOR FILE

| PROCESSOR | TASK |
|---|---|
| 0 | 2 , $S_0$ , 6 , $S_0$ , 5 , $S_0$ 10, $S_0$ |
| 1 | 3 , $S_0$ , 7 , $S_0$ , 1 , $S_0$ , 11 , $S_0$ |
| 2 | 4 , $S_0$ , $S_0$ , 8 , $S_0$ , $S_0$ |
| 3 | $S_0$ , $S_0$ , 9 , $S_0$ , $S_0$ |

FIG. 21

| HEAD TASK NO. | LINKED TASK NO. |
|---|---|
| 1a | 1b |
| 2a | 2b |
| 3a | 3b |
| 4a | 4b, 4c |

FIG. 22

LEVEL FILE

| LEVEL NO. | TASK NO. |
|---|---|
| 1 | 2, 3, 4 |
| 2 | 6, 7 |
| 3 | 5, 1, 8, 9 |
| 4 | 10, 11 |

FIG. 23

| PROCESSOR NO. | TASK |
|---|---|
| 0 | 1a, 1b, $S_0$, 4a, 4b, 4c, $S_0$ |
| 1 | 2a, 2b, $S_0$, 3a, 3b, $S_0$ |

FIG. 24

| PROCESSOR NO. | TASK |
|---|---|
| 0 | 1a, $S_0$, 1b, $S_0$, 4a, $S_0$, 4b, $S_0$, 4c, $S_0$ |
| 1 | 2a, $S_0$, 2b, $S_0$, 3a, $S_0$, 3b, $S_0$ |

FIG. 25

| PROCESSOR NO. | TASK |
|---|---|
| 0 | 2, $S_1$, 5, $S_1$, $S_0$, 10, $S_0$ |
| 1 | $S_1$, 1, $S_1$, $S_0$, 11, $S_0$ |
| 2 | 3, $S_2$, 6, $S_2$, 8, $S_2$, $S_0$, $S_0$ |
| 3 | 4, $S_2$, 7, $S_2$, 9, $S_2$, $S_0$, $S_0$ |

PROGRAM PARALLELIZING APPARATUS CAPABLE OF OPTIMIZING PROCESSING TIME

This application is a continuation application of Ser. No. 07/513,934, filed Apr. 24, 1990, now abandoned.

BACKGROUND OF THE INVENTION

The present invention relates to a program parallelizing apparatus For generating From a source program to be executed an object program which is susceptible to parallel processing by a multi-processor system including a plurality of processors, a communication mechanism For performing inter-processor communications and a synchronizing mechanism for allowing the processing to proceed among the processors through coordination (wait) processing.

Heretofore, in the case where parallel processing is to be performed in a multi-processor system, task scheduling is resorted to in which a program is divided into units each of a large size, such as jobs, sleds or the like, wherein it is prerequisite for the task scheduling to confirm beforehand by a flag check or by a token control method that all the inter-task relations are satisfied.

A technique relevant to this type processing system is disclosed, for example, in JP-A-63-184841.

The prior art program parallelizing technique is disadvantageous in that since the program is divided into units or segments of a large size for scheduling for parallel processing, it is difficult or even impossible to derive the parallelism which the program inherently has, making it difficult or impossible to achieve the parallel processing effectively.

In addition, because the inter-task sequential relation is controlled or managed by the flag check or by the token control, considerable time is required for generating the parallelizing schedule, giving rise to another problem.

SUMMARY OF THE INVENTION

It is therefore an object off the present invention to provide a program parallelizing apparatus for generating object programs at a high speed in correspondence to various source programs universally independent off types off processors incorporated in a multi-processor system which includes a communication mechanism for performing communication among the constituent processors and a synchronizing mechanism for allowing the processing to proceed among the processors through coordination processing such as wait processing, so that the object programs can be processed in parallel with high efficiency in the multi-processor system.

Another object off the present invention is to provide a program parallelizing apparatus which is capable off obtaining the result off task scheduling which can reduce overhead involved in the synchronization processing off the multi-processor system.

It is still another object of the present invention to provide a program parallelizing apparatus which is capable of assigning object programs to be executed to the individual processors, respectively, of the multi-processor system while reducing overhead involved in the synchronization processing by the multi-processor system.

A further object of the present invention is to provide a program parallelizing apparatus which is capable of assigning the object codes to be executed to the individual processors of the multi-processor system such that the time taken for execution in the multi-processor system can substantially be minimized while taking into account overhead attributable to the parallel processing in the multi-processor system.

It is a still further object of in present invention to provide a program parallelizing apparatus having a high universality so as to be compatible with a great variety of processors.

It is yet another object of the present invention to provide a program parallelizing apparatus which is capable of finding out easily the inter-task relations without changing the structure of original program to thereby achieve the scheduling of tasks at a high speed.

According to a First aspect of the present invention, there is provided a program parallelizing apparatus for generating From a source program to be executed an object program susceptible to parallel processing by a multi-processor system which includes a plurality of processors, communication means for allowing communication among the processors and synchronizing means for allowing the processing to proceed in parallel among the processors through coordination or wait processing. The program parallelizing apparatus comprises a task division means for dividing the source program to be executed into tasks to thereby generate the information of inter-task relation by checking operand data contained in the source program, and determining those tasks execution of which is influenced by data resulting from execution of given tasks, or the given tasks execution of which influences the execution of the former, and the information of task processing time by adding the times required for processing machine instructions which constitute the tasks, respectively. The program parallelizing apparatus further comprises a task scheduling means which responds to the task processing time information and the inter-task relation information outputted From the task division means for thereby generating groups of tasks to be executed by the processors, respectively, of the multi-processor system as well as processing sequence information therefor such that the tasks capable of being executed in parallel in the multi-processor system are executed separately by the different processors, respectively, without involving condradiction in the inter-task sequential relation and generating synchronization information indicating time points at which the synchronizing means should perform the coordination or wait processing. There is further provided a parallel compiling means which has a function for defining the tasks generated by the task scheduling means and to be assigned to each of the processors of the multi-processor system and the processing sequence information therefor as object programs to be executed by the individual processors, respectively, in the multi-processor system and assigning the object programs to the processors.

With the structure or arrangement of the program parallelizing apparatus according to the invention described above, it is possible to generate at a high speed from a source program to be executed an object program capable of being processed in parallel by a plurality of processors constituting a multi-processor which includes a communication mechanism for allowing inter-processor communication and a synchronization mechanism for allowing the processings to proceed in parallel among the processors through coordination. Thus, the object program susceptible to parallel processing in the multi-processor system with high efficiency can be generated at a high speed in correspondence to various source programs universally independent of the types of processors.

In accordance with a second aspect of the present invention, it is proposed that the task scheduling means is imparted with a function for generating task link information for linking into one task those tasks which have undergone the task scheduling and which can decrease, when linked together, the number of times the coordination or wait processing is to be performed by the synchronization means and hence the time required for executing the parallel processing in the multi-processor system.

By virtue of the feature of the invention described above, such task scheduling is achieved which can reduce overhead involved in the synchronization processing by the multi-processor system.

In accordance with a third aspect of the invention, it is proposed in conjunction with the second aspect mentioned above that the task scheduling means is imparted with a function for linking the tasks in accordance with the task link information.

Thus, in the program parallelizing apparatus according to the third aspect of the present invention, it is possible to assign the object programs to be executed to the individual processors of the multi-processor system while reducing overhead involved in the synchronization processing by the multi-processor system.

According to a Fourth aspect of the invention, it is proposed that the task division means is imparted with a function for linking the tasks to thereby generate a new task in accordance with the task link information generated by the task scheduling means.

By virtue of this arrangement, it is possible to assign the object codes to be executed to the individual processors of the multi-processor system such that the time taken for execution in the multi-processor system can substantially be minimized while taking into account overhead attributable to the parallel processing in the multi-processor system.

According to a fifth aspect of the present invention, it is proposed that a precompiler is provided for translating the source program into a pre-object program including virtual machine codes expressing individual instructions for various processors in general terms.

By virtue of this feature, the program parallelizing apparatus according to the invention can enjoy a high universality and is compatible with a great variety of processors.

According to a sixth aspect of the invention, it is proposed that the virtual machine codes which can set the data expressed in the form of function in one-to-one correspondence are employed.

Thus, it is possible according to the feature mentioned just above to find out easily the inter-task relation without need for modification of the original program, whereby task scheduling can be accomplished at a high speed, to further advantage.

BRIEF DESCRIPTION OF THE DRAWINGS

FIG. 2 is a diagram illustrating an example of expression in a function form;

FIG. 3 is a diagram showing an example of a task registration table employed in the program parallelizing apparatus;

FIG. 4 is a diagram showing an example of a virtual machine code/real machine code collation table;

FIG. 21 is a diagram showing an example of a task link file;

FIG. 22 is a diagram showing an example of a level file;

FIGS. 23, 24 and 25 are diagrams showing, respectively, further examples of the processor file;

DESCRIPTION OF THE PREFERRED EMBODIMENTS

In the following, the present invention will be described in detail in conjunction with preferred or exemplary embodiments thereof by reference to the accompanying drawings.

First Embodiment

Figure 1:
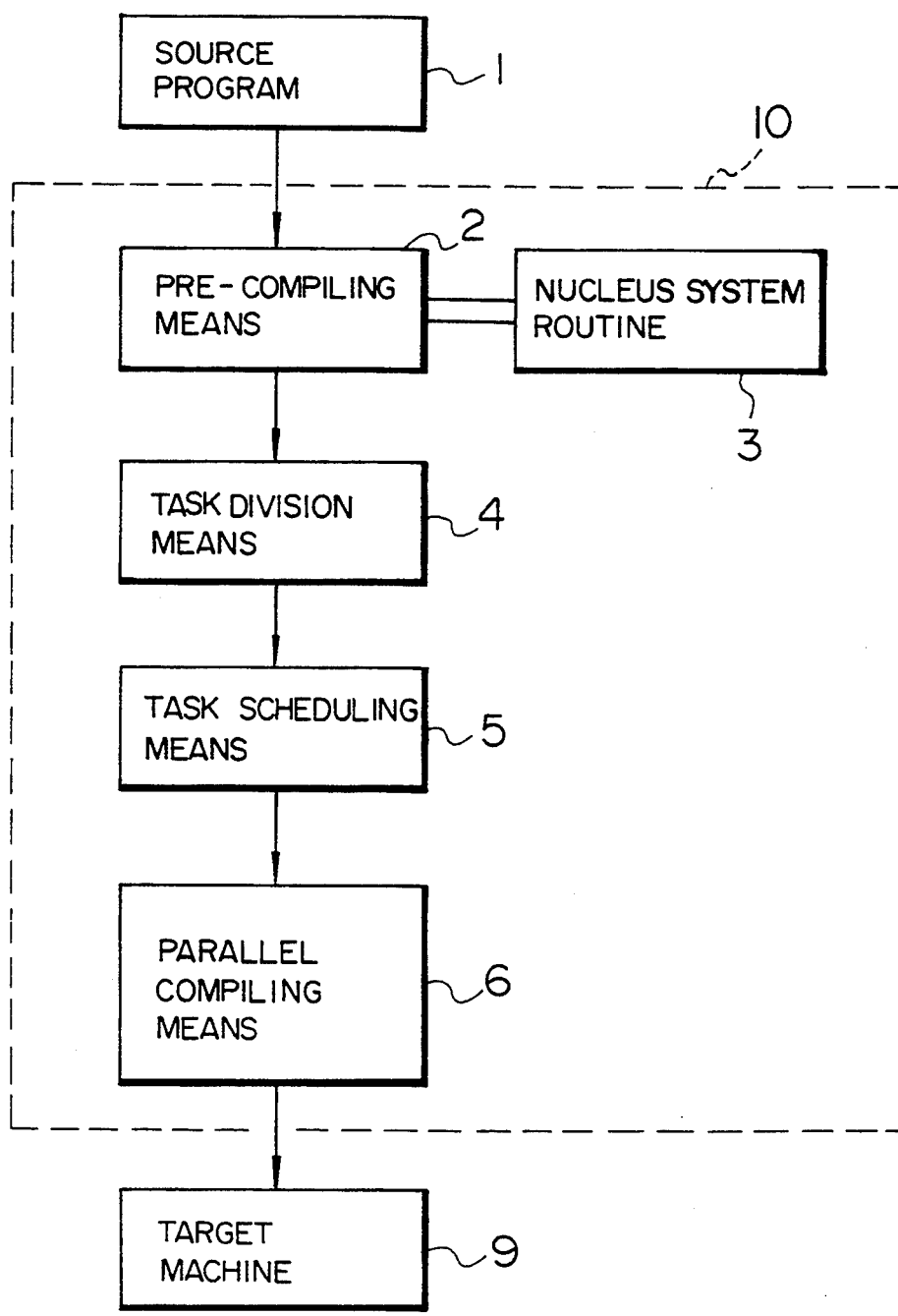
FIG. 1 is a block diagram showing schematically a general arrangement of a program parallelizing apparatus according to a first exemplary embodiment of the invention.

FIG. 1 is a block diagram showing schematically a general arrangement of a program parallelizing apparatus according to a first exemplary embodiment of the invention. Referring to the figure, the program parallelizing apparatus denoted generally by a numeral 10 is composed of a precompiling means 2, nucleus system routines 3, a task division or segmentation means 4, a scheduling means 5 and a parallel compiling means 6.

A parallel processing system (multi-processor system) 9, also referred to as the target machine, adapted to execute objective codes and sequences, which are now capable of being processed in parallel owing to the program parallelizing apparatus 10 according to the invention, includes a plurality of processors, an inter-processor synchronizing mechanism or means for allowing the parallel processings to proceed in parallel among the individual processors without involving confusion or contradiction in the inter-task sequential relation by checking the ends of the tasks as executed, and a communication mechanism or means for ensuring positively data transactions or transfers among the individual processors.

As an example of the inter-processor synchronizing mechanism, there may be employed an inter-processor synchronizing apparatus disclosed in JP-A-63-45670 (Japanese Patent Application Laid-Open No. 45670/1988). On the other hand, the communication mechanism may be implemented, for example, by using a shared memory which permits access thereto from given processors at random at a high speed and with a high efficiency.

The shared memory arrangement mentioned above may be achieved by controlling a bus system connecting the individual processors to the shared memory with the aid of such a high-speed/high-performance signal control circuit such as disclosed in JP-A-62-154057 or JP-A-63-47866, for example.

Figure 28:
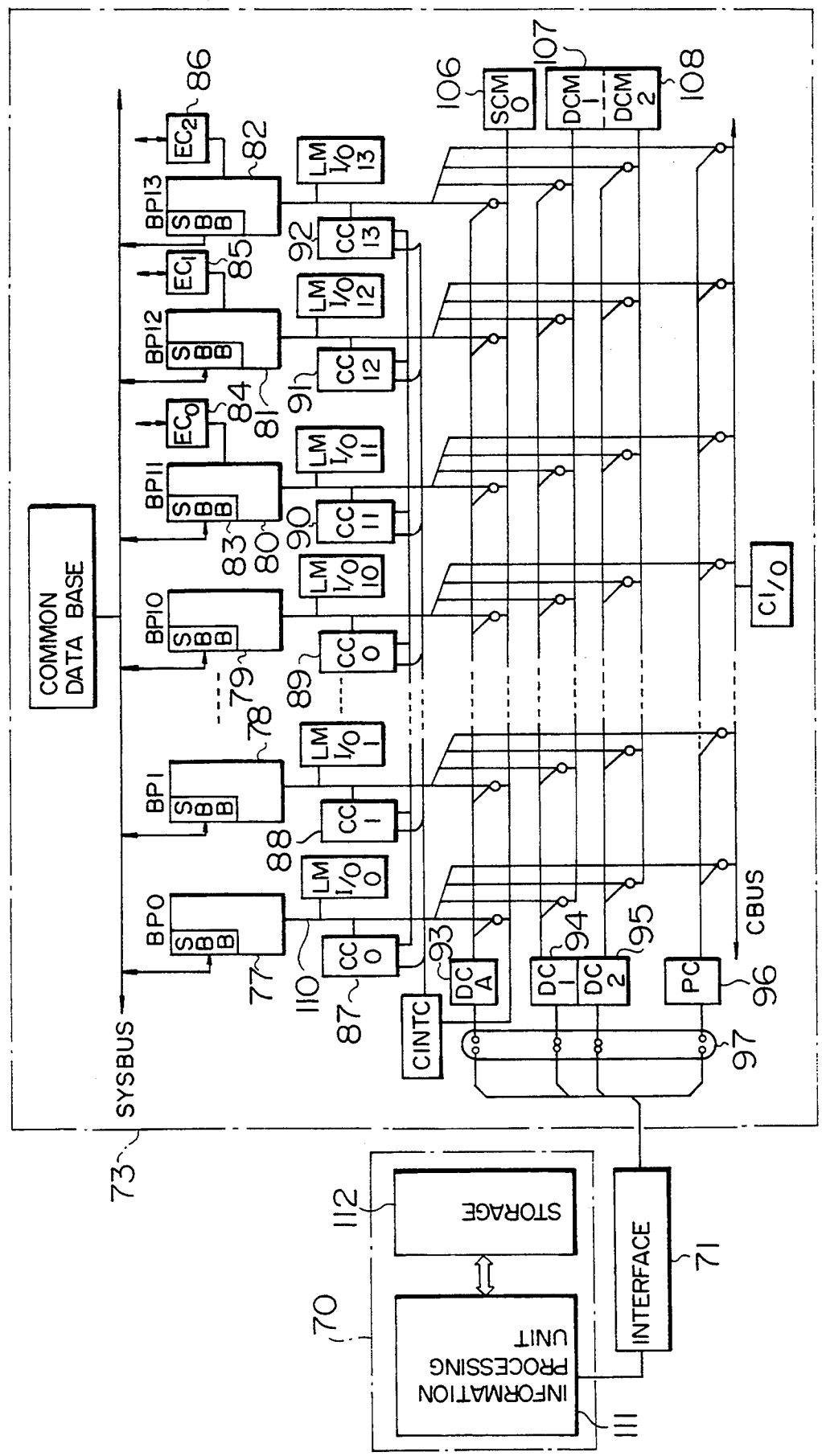
FIG. 28 is a block diagram showing a general arrangement of the program parallelizing apparatus according to a fourth embodiment of the invention.

A typical structure of the target machine 9 is shown as target machine 73 in FIG. 28. In the case of the instant (first) embodiment of the invention, arrangement is made such that the data used in common by a plurality of processors of the target machine 9 is stored in the shared memories, while the data used only by a particular one of the processors is placed in a local memory or register of that particular processor.

In order to make it possible to process a source program 1 in parallel by the multi-processor system or target machine 9, the program parallelizing apparatus 10 according to the instant embodiment operates in such a manner as described below.

The precompiling means 2 translates a source program 1 to be executed into virtual machine codes prescribed by the nucleus system routine 3, which codes are then supplied to the task division means 4. By the phrase "virtual machine code", it is intended to mean a machine code which expresses in general terms a processor instruction and which can satisfies the conditions necessary for the parallelization. More specifically, for satisfying the conditions necessary for the parallelization, there is employed in the case of the instant embodiment such virtual machine code which has the capability of translating the data expressed in the form of functions in one-to-one correspondence. As a method of translating a program to the virtual machine codes, there is such a method as mentioned below by way of example. A table indicating correspondences between statements describing a source program and the nucleus system routines is prepared. This table will hereinafter be referred to as the SN table. The precompiling means 2 translates the source program 1 to the virtual machine codes with the aid of the SN table and the nucleus system routines.

The SN table may be incorporated, for example, in the precompiling means 2. The nucleus system routines are constituted by the virtual machine codes for performing given processings, respectively. A set of such nucleus system routines will be referred to as a nucleus language.

In this way, the precompiling means 2 translates the source program 1 into the virtual machine codes which are then sent to the task division means 4.

In the task division means 4, each of the virtual machine codes supplied from the precompiling means 2 is segmented or separated to units termed the task for generating the data or information concerning the processing time required for the processing of the task and the sequential (preceding/succeeding) relations among the tasks, i.e. the inter-task sequential relations, which may be defined as follows. Let's suppose that the execution of a certain task Q requires indispensably the result of execution of another task P. It is then apparent that the execution of the task P has to be completed before the execution of the task Q can be started. In that case, it is said that the inter-task sequential relation exists between the task P and the task Q, wherein the task P is termed as the ascendent task for the task Q, while the task Q is referred to as the descendent task relative to the task P.

Figures 5, 6:
FIG. 5 is a chart for illustrating an inter-task sequential relation.
FIG. 6 is a diagram for illustrating an example of a task relation table.

The inter-task sequential relations can be indicated by arrows, as illustrated in FIG. 5. The diagram showing the inter-task sequential relation will hereinafter be referred to as the inter-task relation graph.

The task division means 4 can prepare the table indicating the inter-task sequential relations (task relation table) such as shown in FIG. 6 on a case-by-case basis as follows.

(1) In case a source program 1 is described in the form of function:

Since the virtual machine code outputted from the precompiling means 2 is in the form of function, the task A which outputs the data required necessarily for executing each of tasks T constitutes the ascendent task for the latter. Accordingly, on the basis of this relation, the inter-task relation table can be generated.

(2) In case the source program 1 is described in a non-function form:

a) Unless program rewriting is effected at the source program level, a table indicating correspondences between the statements of the source program 1 and corresponding function forms therefor may be provided for the precompiling means 2, wherein the table content and the precompiled virtual machine codes are sent to the task division means 4. Thus, the inter-task relation table indicating the ascendent task A and the descendent tasks T requiring for the execution thereof the data resulting from the execution of the task A can be generated through cooperation of the precompiling means 2 and the task division means 4.

b) In contrast, when program rewriting is effected at the source program level, the source program is translated into a function form at the level of task module which can be regarded as a minimum unit as described below, so that the instant case can be reduced to the abovementioned case (1).

i) In case the source program uses only the memory variables (without using register variables), this corresponds to a source program which is constituted only by the memory operations without resorting to the register operation. When the shared memory is selected as the above-mentioned memory, data in the shared memory can be accessed by any given one of the processors. As the method for translating the source program into the function form, there may be mentioned a method according to which different variables and constants ape not identified with a same name. An example of this method is illustrated in FIG. 2. Referring to the figure, "a=b+c" means that "(b+c) is executed, whereon the result of the execution is substituted for a". As an algorithm for the translation to the function form in this manner, there may be mentioned such a translation algorithm as described below.

When a character (or a character string) representing a name of a same variable or constant makes appearance m times (m>2) in the description at the left-hand side to the equality sign, the left-hand side of the i-th expression (where $2 \leq i \leq m$) is translated into a character (or character string) $N_i$ which differs from the character (or character string) $N_1$ representing the variable or constant name of the First occurrence, whereon in the expressions including the next one (i+1) to the expression inclusive thereof in which the same character or character string $N_i$ makes appearance on the left-hand side of the equality sign, the same character string on the right-hand sides are rewritten by the same character string $N_i$. By repeating the above procedure for each i given by $2 \leq i \leq m$, the source program is transformed to the function form, which can thus be processed similarly to the abovementioned case (1).

ii) In case the source program uses register variables, either one of the undermentioned methods (A) or (B) is adopted.

A) All register operations are translated into memory operations, which can thus be reduced to the aforementioned case (2)-b)-i).

B) A module is established as the minimum unit of task, which can be loaded from a memory and stored in a memory. To this end, the source program is divided or segmented so as to be compatible with the modules. When the simple division of the source program is insufficient, memory load instruction as well as memory store instruction may be added and inserted. Thus, this case can be reduced to the aforementioned case (2)-b)-i).

As the task segmenting or dividing method which can be adopted in conjunction with the task division means 4, there may be mentioned, by way of example, a method which is described below.

The source program 1 is translated to the virtual machine codes by the precompiling means 2. The task division means 4 translates the virtual machine codes developed up to the singular virtual machine code units into tasks such that one virtual machine code constitutes or corresponds to one task, wherein the contents of the tasks (i.e. the virtual machine codes contained in the tasks) are registered in a task registration table, which contains the task identification numbers (Nos.), the virtual machine codes contained in the individual tasks, and the task processing times, as is shown in FIG. 3. Subsequently, by consulting a virtual machine code/real machine code collation table shown in FIG. 4 and by referring to the column of the real processor of the target machine which is to be used, the processing time required for executing the task of concern by that processor is registered as the task processing time in the task registration table at the column labeled "task processing time". The virtual machine code/real machine code collation table indicates the machine codes of the real processors corresponding to the virtual machine codes and the respective processing times on a virtual machine code basis for each of the real processors. In the task registration table shown in FIG. 3, it is assumed, by way of example, that the real processor of concern is a processor A.

As to the method of generating the task relation table by the task division means 4, description has already been made. FIG. 6 shows a task relation table for a group of tasks having a task relation graph illustrated in FIG. 7.

Figure 7:
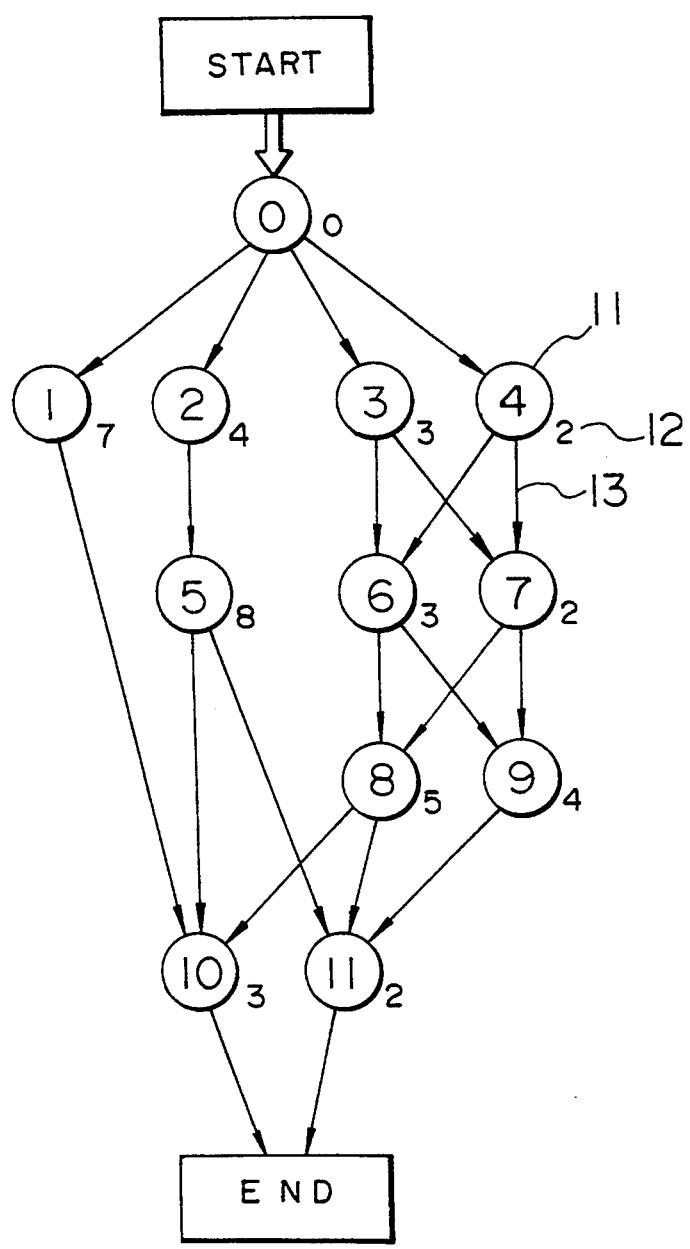
FIG. 7 is a diagram showing an example of a task relation graph.

Referring to FIG. 7, numerals each shown in a circle 11 represent the task identification numbers, respectively, and numerals 12 each adjacent to a circle 11 represent the times required for the processings of the associated tasks, and arrows 13 indicate the inter-task sequential relations defined hereinbefore. In FIG. 6, the inter-task relations are shown by indicating the ascendent task(s) to each off the tasks. It is however apparent that the task relation table may also be implemented by indicating the descendent task(s) to each of the tasks. Alternatively, both the ascendent tasks and descendent tasks may be registered in the task relation table.

As will now be appreciated from the above, the task division means 4 segments or divides a group off the virtual machine codes outputted from the precompiling means 2 to thereby generate the task registration table indicating the contents of the individual tasks and the processing times taken for executing them, respectively, as well as the task relation table indicating the inter-task sequential relations, whereby information of the task processing time and that of the inter-task sequential relation can be supplied to the task scheduling means 5 from the task division means 4.

According to the task division method adopted in the instant embodiment of the invention, one task comprises one virtual machine code. However, the invention is never limited to such task division method, for example, one or plural statements before the precompilation may comprise one task, wherein the virtual machine code or codes resulting From the precompilation or translation off the statement(s) may be registered as one task in the task registration table or alternatively one task may comprise a plurality of machine codes. In these cases, the processing time for each task as well as the inter-task sequential relation can equally be generated by the methods described previously.

The task scheduling means 5 serves for scheduling the group of tasks supplied thereto while maintaining the inter-task sequential relations to thereby parallelize the tasks such that the entire processing time taken for execution of all the tasks can approach to a minimum or shortest processing time (i.e. the processing time scaled along the critical path) in the parallel processing performed in the target machine 9 under the given conditions for the task, the task processing time and the inter-task sequential relation.

For realizing such task scheduling means, there may be employed, for example, such an algorithm as mentioned below.

Figure 8:
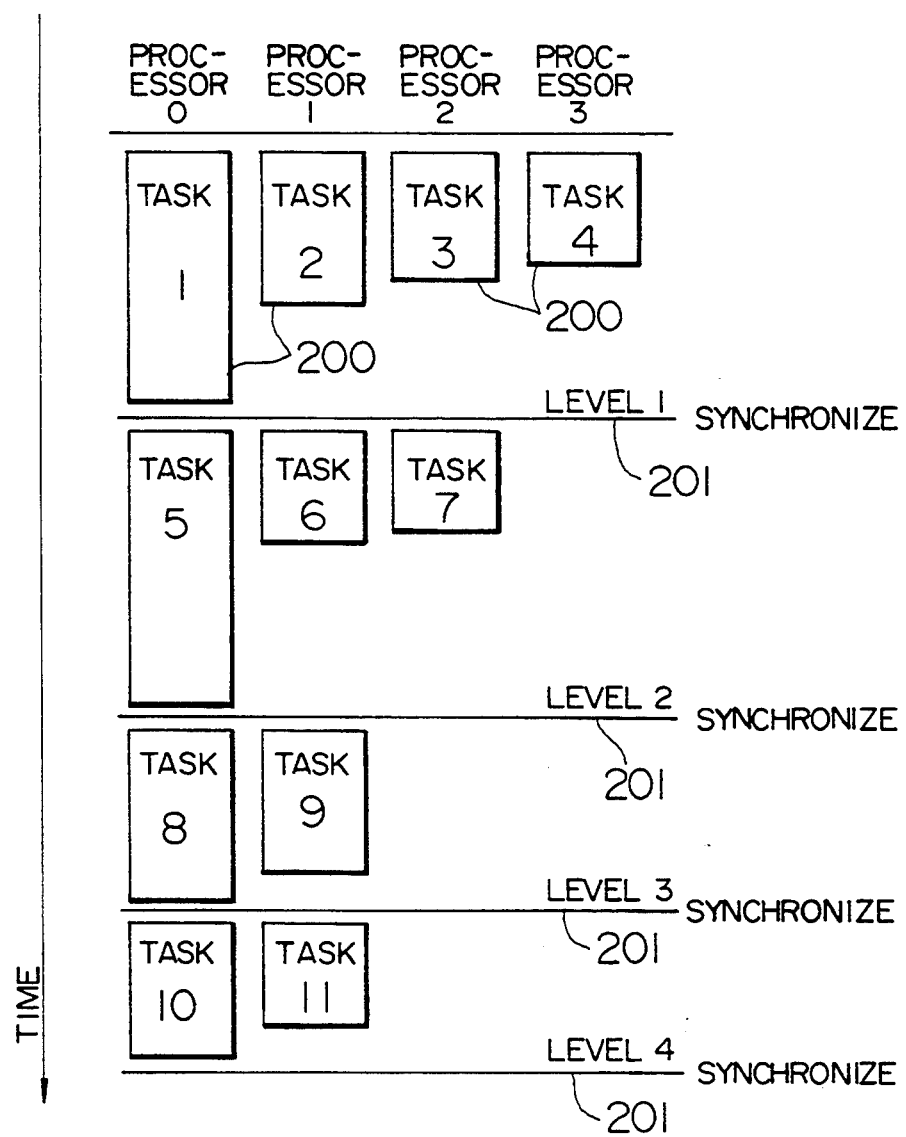
FIG. 8 is a diagram showing an example of the initial positions of tasks in a parallelizing schedule.

At first, the tasks are initially so positioned as to be processed as rapidly as possible (i.e. immediately when the conditions permitting the task processing have been met) while taking into consideration the inter-task sequential relation as given. FIG. 8 is a diagram showing the result of the initial positioning of the tasks having the inter-task sequential relation and the task processing times shown in FIG. 7. Referring to FIG. 8, each of rectangles 200 represents a task, and lines 201 indicate synchronized processing. By the phrase "synchronized processing", it is intended to mean such wait or coordination processing performed in the course of the parallel processing in which the tasks being processed by the individual processors are forced to wait for the next processing until the tasks executed in parallel by the processors simultaneously have been all completed and in which the processors are allowed to proceed to the next processing only after completion of the task processings performed by all the processors participating in the parallel processing has been confirmed. For convenience oft description, each oft the synchronized processings is referred to as the level, wherein the level executed in precedence is termed the level oft a high rank with the level executed in succession is referred to as the level oft a low rank.

According to the instant embodiment of the invention, the levels defined above are affixed with the level identification numbers sequentially on the time base such as level 1, level 2, level 3, . . . , level n, as shown in FIG. 8, wherein the level 1 is oft the highest rank with the level n being oft the lowest rank. Thus, the tasks placed at the same level are susceptible to the parallel processing. When there exists an ascendent task A for a task B to be executed at the level n, the ascendent task A must naturally lie at a level higher than the level n.

The initial placement can be realized by resorting to an algorithm which will be described below.

Figures 9, 10:
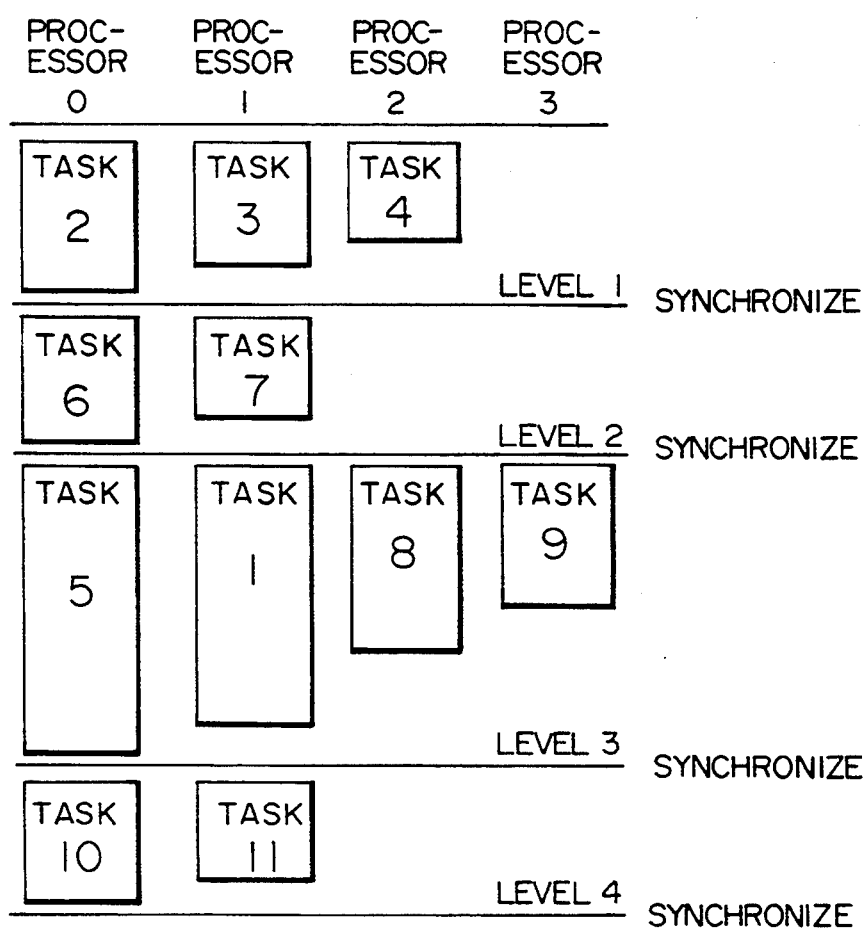
FIG. 9 is a diagram showing an example of a level file.
FIG. 10 is a diagram showing an example of the parallelizing schedule in which simultaneous synchronization is employed.

At first, the initial value oft the level number i is set to 1 (one), whereon the task(s) having the task 0 as the ascendent task is registered in a level file shown in FIG. 9 at the level i ($=1$). Upon placement or positioning oft the task and registration thereof, the tasks are arrayed sequentially in such order that the task of the longest processing time is located at the leftmost position on any row.

Next, for the other tasks than those registered at the levels 1 to i, the presence of the ascendent tasks them are checked. When these ascendent tasks are all at the levels 1 to i, they are registered at the level $(i+1)$. Subsequently, the level number i is incremented to $(i+1)$, which is then followed by the registration of the succeeding level in accordance with the algorithm. When there exist no tasks which are not registered at the levels (i.e. when all the tasks have been registered in the level registration table), the algorithm or procedure comes to an end.

In the above, an example of the algorithm for the initial task placement has been described. Since the result of the initial task placement can not necessarily reduce the entire processing time to a possible minimum, a further reduction of the entire or overall processing time is attempted. To this end, an algorithm mentioned below by way of example may be employed.

The levels at which the tasks are initially placed are defined as the first level (of the highest rank) to n-th level (of the lowest rank), wherein the time taken for processing the leftmost task $T_{i1}$ of those belonging to a given one i of the levels (i.e. the maximum task at the given level i) is represented by ST1 with the processing time for the second task $T_{i2}$ from the left being represented by ST2. Further, the time taken for processing the maximum task $T_{j1}$ belonging to the level j of a lower rank than the level i is represented by DT1.

In the first place, by setting i equal to $(n-1)$, it is determined whether or not the leftmost task $T_{i1}$ of those tasks belonging to the level i can be moved to any one of the levels which are of lower rank than the level $(i+1)$ and inclusive of the level n while satisfying the condition for the inter-task sequential relation. Let's assume that the task $T_{i1}$ can be moved without disturbing the inter-task sequential relation. In that case, the destination level to which the task $T_{i1}$ is to be moved is represented by j, whereon E given by the undermentioned expressions are evaluated.

$E = DT1 - ST2$, when $ST1 > DT1$ $E = ST1 - ST2$, when $ST1 \leq DT1$.

In case $E \geq 0$, it is determined that the task $T_{i1}$ can be moved from the level i, whereon the task $T_{i1}$ is moved to the level j at which E is maximum. On the other hand, when it is determined that the task $T_{i1}$ cannot be moved, then the procedure proceeds to a processing which is performed when the leftmost task of the level i can not be moved to the level j, as described later on. In case a plurality of levels j exist at which E becomes maximum, the task $T_{i1}$ is then moved to the level of as low a rank as possible, and similar manipulation is performed for the task which assumes the leftmost position at the level i as the result of the move mentioned above. When the leftmost task at the level i can no more be moved to the level j, the remaining tasks of the level i are moved in the order starting from the task requiring the maximum processing time to the levels as low as possible so far as the inter-task sequential relation permits on the condition that the overall processing time is not thereby increased. When the move is impermissible, the task is left at the initial level.

When the decision as to the movability has been completed for all the tasks, then i is set to $(n-2)$, whereon the procedure described above is repeated, being Followed by the similar procedures sequentially by setting i to $(n-3)$, $(n-4)$, . . . , 1 (one), respectively.

Through the manipulation or procedure described above, all the tasks are moved to as low levels as possible while maintaining the inter-task sequential relation on the condition that the overall processing time can be shortened or at least remain invariable from that taken in the initial placement of the tasks. This procedure is referred to as the downward sweep algorithm. Subsequently, all the tasks are moved to the levels of as high ranks as possible on the conditions that the inter-task sequential relation can be maintained and that the overall processing time can be shortened or at least remain invariable when compared with the result of the scheduling performed by the first downward sweep algorithm. This procedure is called the upward sweep algorithm. Since the upward sweep algorithm differs from the downward sweep algorithm only in respect to the direction in which the tasks are moved, the former can be achieved by an algorithm similar to the downward sweep algorithm with the task move direction being changed to the upward direction. By executing the downward sweep algorithm alternately with the upward sweep algorithm, the overall processing time can progressively approach to the processing time for the critical path. By completing the execution of the upward sweep algorithm and the downward sweep algorithm at the time when the overall processing time can no more be shortened by either the upward or downward sweep algorithm, there can be attained the quasi-optimal task scheduling which can minimize the entire processing time while satisfying the conditions given for the tasks, the inter-task sequential relation and the task processing time. FIG. 10 is a diagram showing the result of the scheduling realized by moving the task from the task positions shown in FIG. 8 in accordance with the algorithms mentioned above. As can be seen from FIG. 10, the entire processing time can be shortened when compared with the initial scheduling shown in FIG. 8.

The abovementioned scheduling is performed on the conditions that all the processors are synchronized simultaneously and thus is referred to as simultaneously synchronized scheduling.

On the other hand, such arrangement may also be adopted in which teams are each constituted by several ones of the processors, wherein the relevant tasks are processed on a team basis with the processors within the team being synchronized (intra-team synchronization) while synchronization is established among the teams, as occasion requires, which is referred to as the inter-team synchronization. Further, the scheduling scheme using the team synchronization is called team synchronous scheduling.

Figure 11:
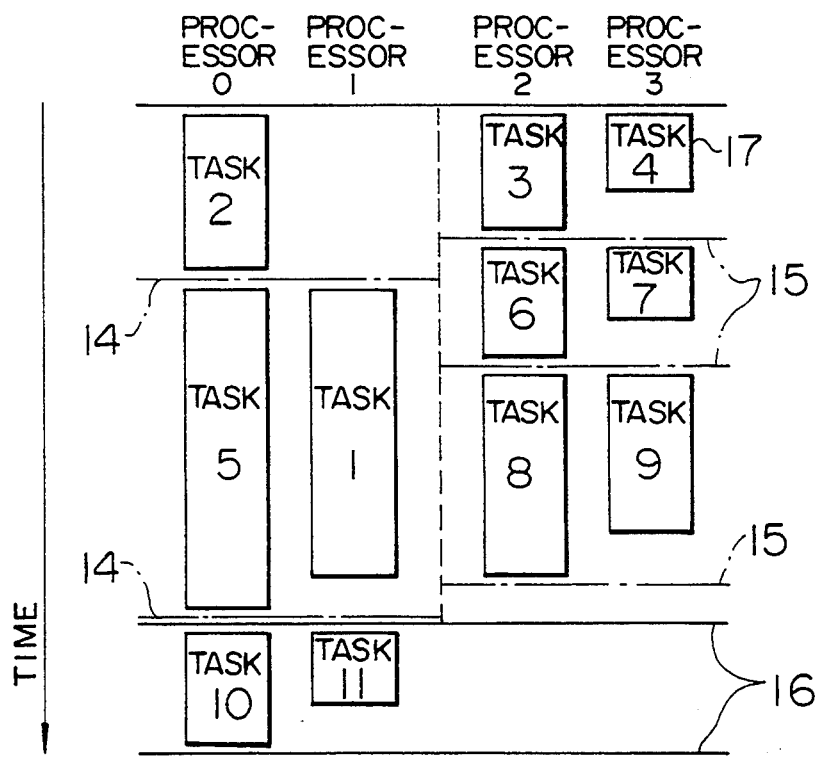
FIG. 11 is a diagram showing an example of the parallelizing schedule in which a team synchronization is employed.

FIG. 11 is a diagram showing the result oft the scheduling performed by using the team synchronization for the result oft the scheduling based on the simultaneously synchronized scheduling. Referring to FIG. 11, the processors No.0 and No.1 constitute a team A with the processors No.2 and No.3 constituting a team B, wherein during a period from a time point $t_0$ to $t_1$, the team A is in charge oft the tasks 2, 5 and 1 with the team B being assigned with the tasks 3, 4, 6, 7, 8 and 9, and the intra-team synchronization is established for the teams A and B, separately, as indicated by lines 14 and 15 (intra-team synchronizations 14 and 15), respectively. The scheduling for allowing the overall processing time to approach to the critical path processing time as close as possible by using the team synchronization scheme in this manner is referred to as team-synchronization based scheduling. As is apparent from the comparison of FIGS. 10 and 11, the team-synchronization based scheduling can further reduce the overall processing time as compared with the simultaneously synchronized scheduling. For carrying out the team-synchronization based scheduling, an algorithm mentioned below may be employed after the initial task scheduling. Parenthetically, the initial task scheduling may be performed in accordance with the simultaneously synchronized scheduling mentioned above. In the description which follows, it is assumed that the tasks are present at all the levels 1 to n as the result of the initial task scheduling.

At first, the result of the initial scheduling is checked sequentially from the high level to the low level to determine first whether the critical path extends through the task of the longest processing time at a level i. When it is determined that the critical path extends through the task requiring the longest processing time at a given level, then the next level is checked similarly. If otherwise, the level i and the level (i+1) are provisionally linked together, whereon those tasks which belong to the linked level and which bear the inter-task sequential relation to one another are collected to thereby constitute a team, wherein for each of the teams, the task scheduling is performed in accordance with the simultaneously synchronized scheduling algorithm described previously. After the scheduling, the task requiring the longest processing time in each team is compared with the processing time of that task before constituting the team. When the comparison shows that the processing time is further reduced, that team is then registered, whereon requisite numbers of processors Nos. 0, 1, 2 and so forth are assigned to the teams sequentially, starting from the team registered first. Unless the processing time is diminished, a processing U described hereinafter is resorted to. When the processing time is improved, the procedure described above is repeated for a team constituted newly by collecting the tasks belonging to the three simultaneously synchronized levels i, i+1 and i+2 and interconnected through the inter-task sequential relation irrespective of the teams already registered. When the processing time is reduced, the next level is added to constitute a new team and the similar procedure for examination is repeated. When the processing time can no more be shortened, the procedure proceeds to the processing U where the team constituted in the manner mentioned above is sequentially added with the levels of higher rank to reconstitute the teams for diminishing the overall processing time.

At the time when the overall processing time can no more be reduced, decision is again made for the lowest level of the reconstituted team as to whether or not the critical path extends through the task requiring the longest processing time, whereon the procedure described above is repeated in dependence on the result of the decision.

The initial scheduling to be performed in precedence to the start of the team-synchronization based scheduling may be carried out in accordance with a method described below.

At first, the simultaneously synchronized scheduling is performed. It is assumed that as the result of this simultaneously synchronized scheduling, the tasks are present at all the levels 1 to n. In that case, the initial value of the level number i is set to 1 (one), whereon the levels i and (i+1) are provisionally linked to each other. By collecting those tasks belonging to the linked levels which bear the inter-task sequential relation to one another, a task team is constituted, whereon the scheduling is performed for each team in accordance with the simultaneously synchronized scheduling algorithm described hereinbefore. The processing times required by the tasks in each team after the abovementioned scheduling are compared with those before the scheduling. When the comparison shows that the processing time can be reduced, the corresponding team is registered. Thereafter, the requisite numbers of the processors Nos. 0, 1, 2 and so forth are sequentially assigned to the teams orderly, starting from the first registered team. Unless any improvement can be seen in the processing time after the abovementioned scheduling, then the level number A is incremented by one (i.e. i=i+1), and the procedure mentioned above is repeated. On the other hand, when the processing time is improved, those tasks belonging to the three simultaneously synchronized levels i, i+1 and i+2 which bear the inter-task sequential relation to one another are collected to constitute a new team irrespective of the teams already registered, whereon the procedure described above is repeated. When the processing time can thus be reduced, the next level is added to reconstitute the team, whereon the similar examination procedure is performed. When the processing time can no more be reduced, the team existing at that time point is registered finally. Subsequently, for the succeeding level j, the level number i is set equal to j, whereon the abovementioned algorithm is repeatedly applied. Upon completion of the examination up to the level n, the initial scheduling comes to an end.

Figures 18, 19:
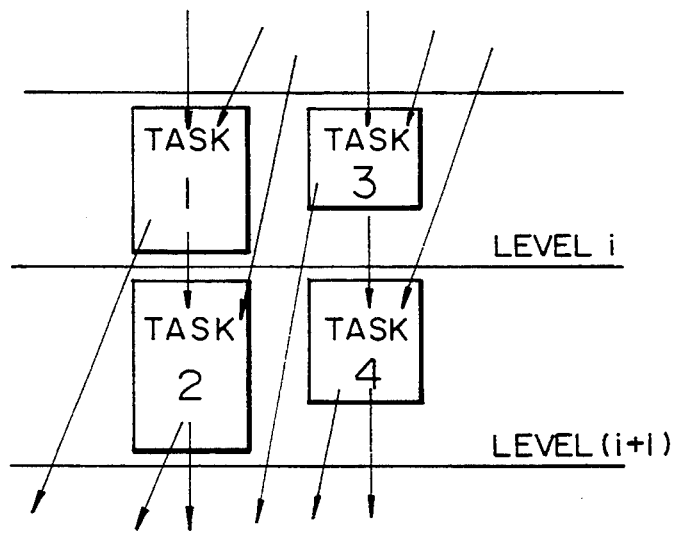
FIG. 18 is a diagram for illustrating, by way of example, the conditions for task linking.
FIG. 19 is a diagram showing an example of a processor file.

As will now be appreciated from the above, the task scheduling means 5 which execute the scheduling algorithms based on the simultaneously synchronization or team synchronization scheme can minimize the overall processing time to thereby make the latter approach to the processing time scaled along the critical path under the conditions given for the task, the task processing time and the inter-task sequential relation as supplied from the task division means 4. As the result of this scheduling, there are generated a level file indicating the tasks belonging to the individual levels, a processor file indicating the tasks to be processed by the individual processors and the types of synchronizations in the order of the processings to be executed and a common variable file indicating the names of common variables and addresses thereof. FIG. 22 shows a level file corresponding to the result of scheduling described above by reference to FIG. 10. Further, FIG. 19 shows the corresponding processor file, in which reference symbol $S_0$ represents simultaneous synchronization instructions or commands. It should be mentioned that when other synchronization instructions or commands such as a team synchronization command and the like are inserted, a processor file similar to that shown in FIG. 19 may be generated.

FIG. 25 shows, by way of example, a processor file corresponding to the result of the scheduling based on the team synchronization illustrated in FIG. 11. Referring to FIG. 25, reference symbol $S_0$ represents a simultaneous synchronization command, $S_1$ represents an intra-team synchronization command for a team including the processors Nos. 0 and 1, and $S_2$ represents an intra-team synchronization command for a team including the processors Nos. 2 and 3.

Figure 12:
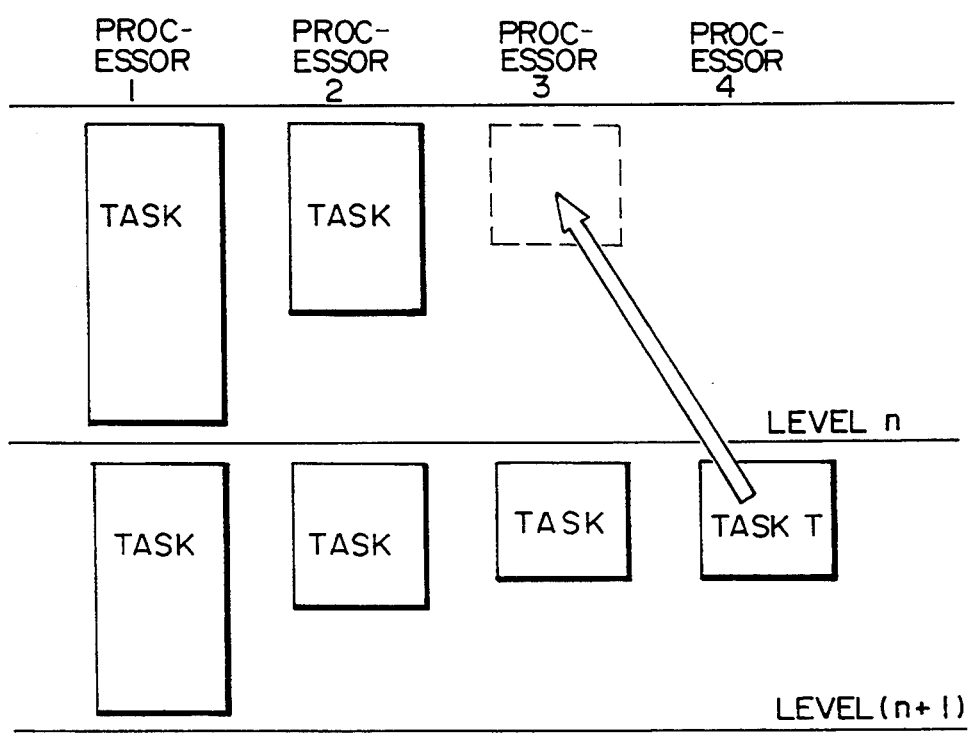
FIGS. 12 and 13 are diagrams for illustrating, respectively, examples of task move capable of decreasing the numbers of processors to be used.

After the scheduling mentioned above, the task scheduling means 5 may move the task assigned to a certain processor at a given level to a level where there exists a processor assigned with no task so that the number of the processors to be used can be decreased to a possible minimum while preventing the entire processing time from being increased under the conditions permissible from the standpoint of the inter-task sequential relation, to thereby assign the task to the level where the processor is present which is not assigned with the task. By way of example, a task T assigned to the level (n+1) where the processor No. 4 is present may be moved to the level 3 where the processor No. 3 exists, as is illustrated in FIG. 12, to thereby decrease the number of the processors to be used without increasing the overall processing time.

Further, a task assigned to a certain one of the processors may be linked to a task assigned to another processor to thereby decrease the number of the processors to be used while maintaining the inter-task sequential relation, so long as the overall processing time is not increased.

Figure 13:
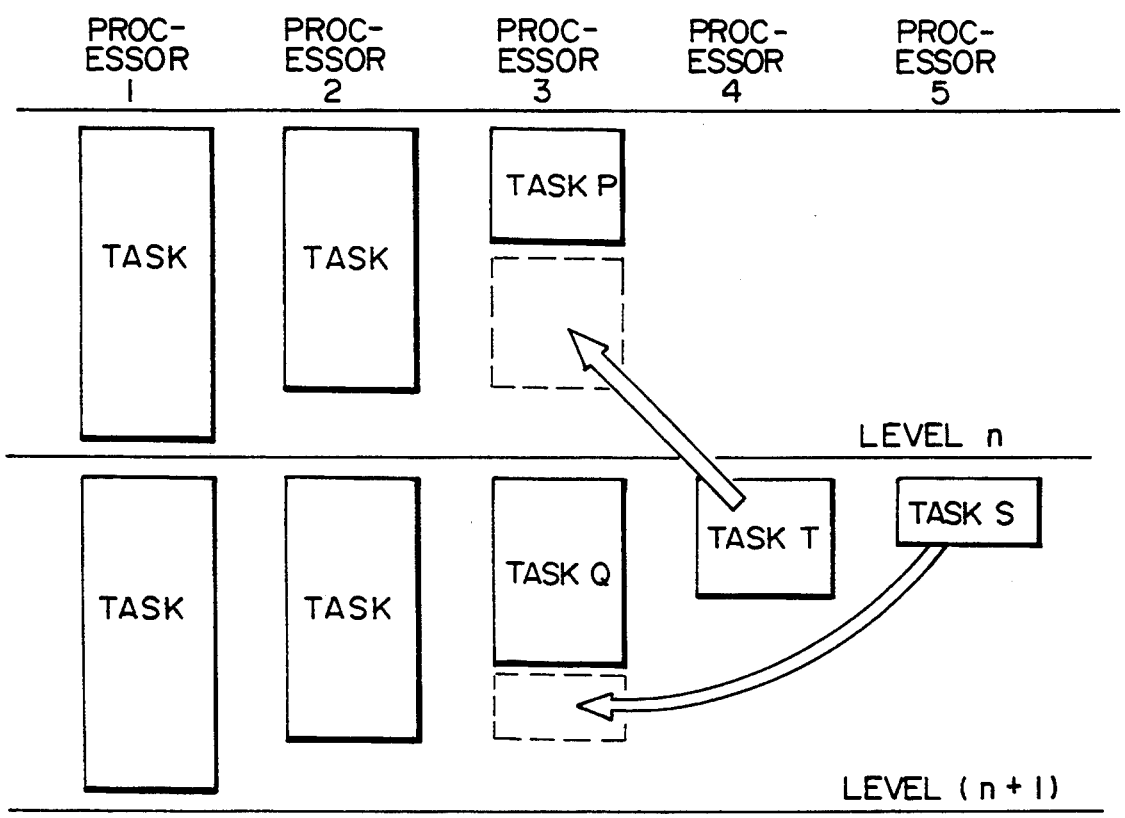

By way of example, referring to FIG. 13, a task T assigned to the level (n+1) of the processor No. 4 may be linked to a task P assigned to the level n of the processor No. 3, while a task S assigned to the level (n +1) of the processor No. 5 may be linked to a task Q assigned to the level (n+1) of the processor No. 5. The task linkings mentioned above are possible only when the inter-task sequential relation permits such moves of the tasks T and S.

In the abovementioned case, the number of the processors to be used can be reduced from five to three. By this type task scheduling means 5, there can be generated at a high speed the task schedule which allows the above-mentioned multi-processor system to perform the parallel processing with a high efficiency. The task scheduling means 5 may further be imparted with a task linking information generating function, as described below.

Figure 14:
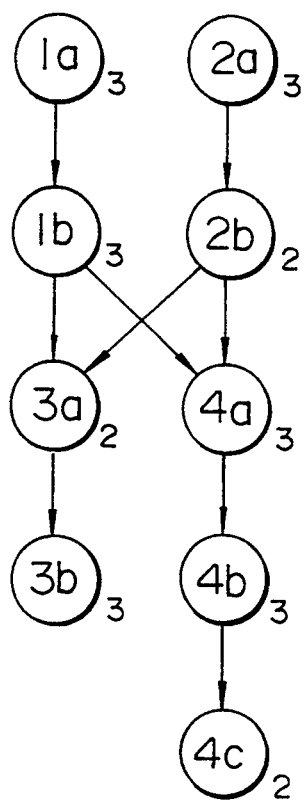
FIGS. 14 and 15 are diagrams showing, respectively, further examples of the task relation graph.
Figure 16:
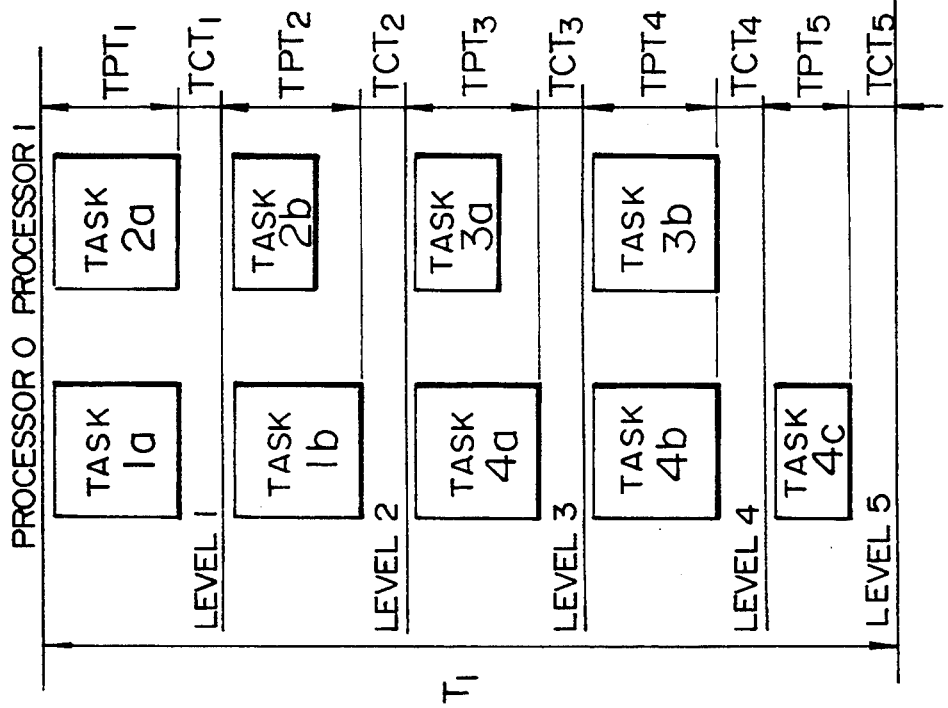

Referring to FIG. 14, when a group of tasks including tasks (having task names or identifiers represented by symbols in circles), the task processing times (indicated by numerals affixed to the circles) and the inter-task sequential relation (indicated by task interconnecting arrows) are scheduled by the task scheduling means 5 described above, there can be obtained such results as illustrated in FIG. 16. Referring to the figure, $TPT_i$ represents the longest one of the processing times for the tasks belonging to the level i, and $TCT_i$ represents the time involved in the parallel processing for the level i (such as overhead related to the synchronization, communication and others). Assuming now that the result of scheduling shown in FIG. 16 is to be executed, the overall processing time $T_1$ is given by $$T_1 = \sum_{i=1}^{n} (TPT_i + TCT_i)$$

where n represents the number of the levels. Accordingly, in order to shorten the overall processing time $T_1$ to a minimum under given conditions for the tasks, the task processing times and the inter-task sequential relation, it is required to minimize $$\sum_{i=1}^{n} TPT_i \text{ and } \sum_{i=1}^{n} TCT_i.$$

However, since the algorithm for minimizing $$\sum_{i=1}^{n} TPT_i$$

has already been executed (as described in conjunction with the scheduling algorithm), it is only necessary to minimize $$\sum_{i=1}^{n} TCT_i.$$

To this end, either each of $TCT_i$ or the number of the levels may be decreased. In the target machine 9, the processing for synchronization is implemented in hardware with $TCT_i$ being minimized. Thus, by adopting a method of decreasing the level number n, $$\sum_{i=1}^{n} TCT_i$$

is minimized to be as small as possible. In the target machine 9, since $TCT_i$ is substantially due to overhead related to the synchronization, the minimization of $$\sum_{i=1}^{n} TCT_i$$

can be achieved by decreasing the number n of synchronizations. Accordingly, those off the tasks existing at two or more levels off which linkage does not lead to increasing off $$\sum_{i=1}^{n} TPT_i$$

are linked together to decrease the number of synchronizations and hence $$\sum_{i=1}^{n} TCT_i,$$

to thereby shorten the overall processing time. Now, let's define a program parallel processing efficiency n as a ratio off the net task processing time $$\left( \sum_{i=1}^{n} TPY_i \right)$$

to the overall processing time inclusive off the parallel processing overhead $$\left( \sum_{i=1}^{n} TCT_i \right).$$

Namely, $$\eta = \frac{\sum_{i=1}^{n} TPT_i}{\sum_{i=1}^{n} (TPT_i + TCT_i)}$$

Figure 15:
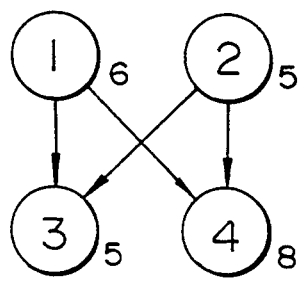
Figure 17:
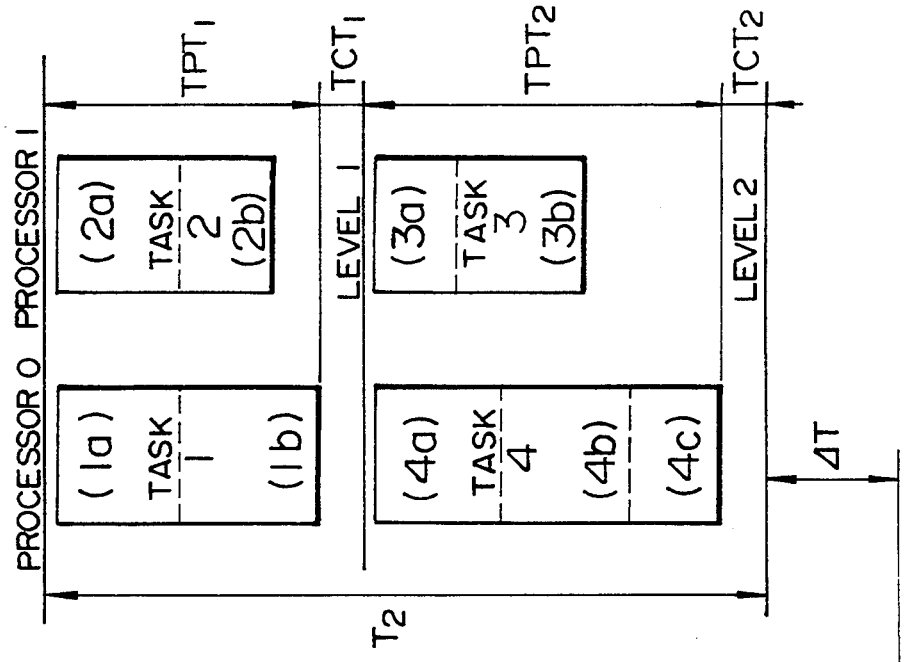
FIGS. 16 and 17 are diagrams showing, respectively, examples of the parallelizing schedule in which simultaneous synchronization is employed.

It is thus apparent that the procedure described above contributes to enhancement of the parallel processing efficiency. Describing by taking as example the result of scheduling shown in FIG. 16, the levels 1 and 2 are linked, whereby the tasks 1a and 1b are linked into a task 1 while the tasks 2a and 2b are linked into a task 2. Subsequently, the levels 3, 4 and 5 are linked, whereby the tasks 4a, 4b and 4c are linked into a task 4, while the tasks 3a and 3b are linked into a task 3. As a result of this, the tasks 1 to 4 newly generated can be scheduled in such a manner as illustrated in FIG. 17. Consequently, when the processing is executed in accordance with the schedule shown in FIG. 17, the overall processing time $T_2$ can be shortened by $\Delta T$ when compared with the processing time $T_1$ shown in FIG. 16 to advantage. It should be noted that the task linkage mentioned above changes not only the task content and the task processing time but also the inter-task sequential relation. When the task linkages illustrated in FIG. 17 are performed, the inter-task sequential relation shown in FIG. 14 is changed to such a relation as shown in FIG. 15. In this way, the task scheduling means 5 can generate task linkage information for the tasks which can diminish the overall processing time when linked. Of course, it should be understood that the task scheduling means 5 may also be so arranged as to perform only the scheduling without generating the task linkage information. FIG. 18 is a diagram for illustrating, by way of example, conditions for the inter-task relations and the task processing times which allow the overall processing time to be shortened by applying the task linkage scheme. Referring to FIG. 18 and assuming that the levels A and (i+1) are to be linked, it can be seen that only one descendent task $B_j$ exists at the level (i+1) for a given task $A_j$ belonging to the level i while the ascendent task at the level i for the descendent task $B_j$ is only the task $A_j$. Accordingly, linkage of the tasks $A_j$ and $B_j$ can decrease $$\sum_{i=1}^{n} TCT_i$$

without increasing $$\sum_{i=1}^{n} TPT_i.$$

Figure 20:
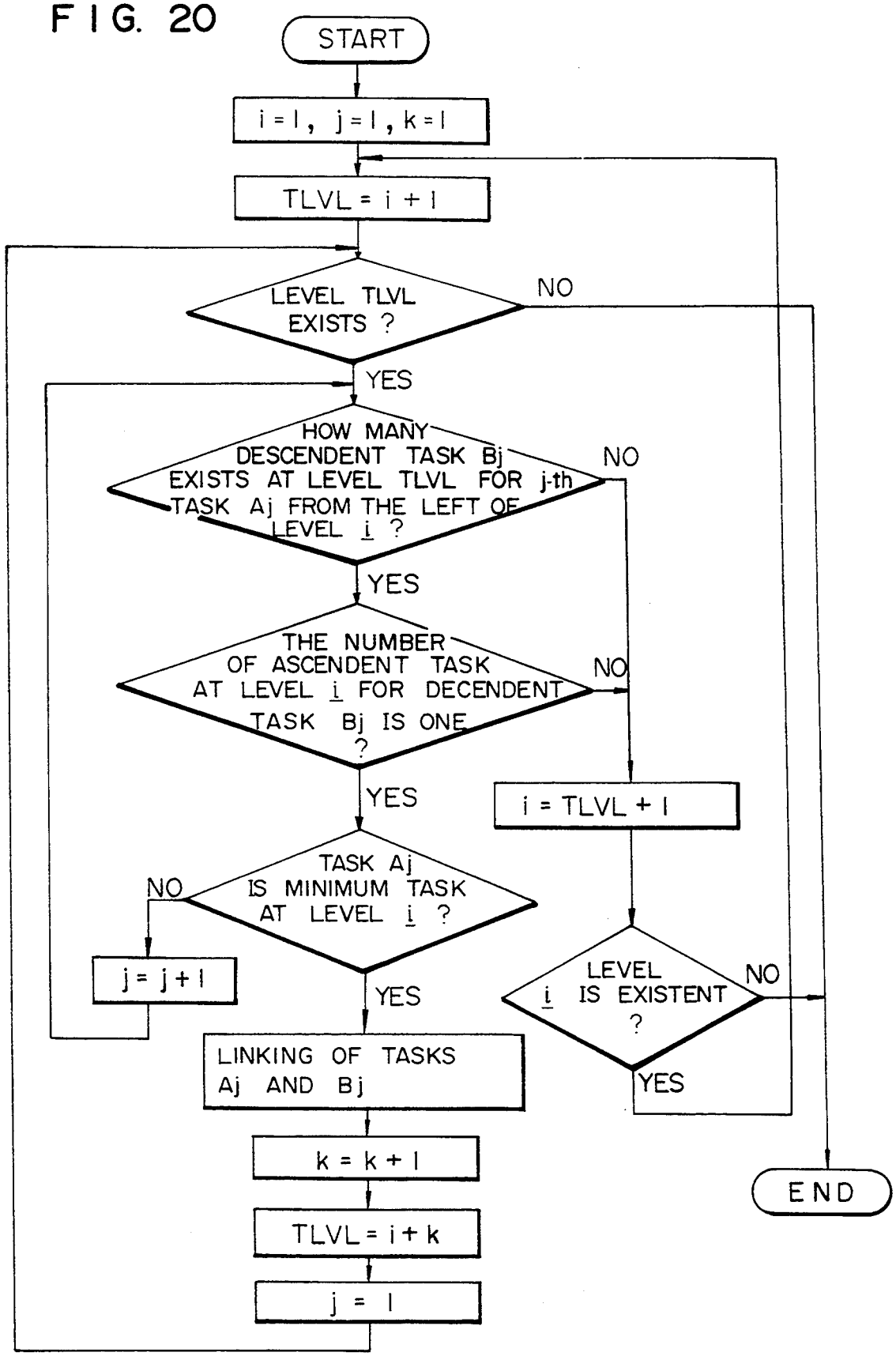
FIG. 20 is a flow chart for illustrating an example of an algorithm for the task linkage.

Thus, it is decided that the task $A_j$ can be linked with the task $B_j$. FIG. 20 is a flow chart for illustrating an algorithm for making decisions as to the possibility of the task linkage such as mentioned above. Referring to FIG. 20, the state in which the task scheduling by the task scheduling means 5 has been completed is represented by "START". Since the team synchronization can be regarded as the simultaneous synchronization performed internally of the team, this task linkage algorithm can be applied either to the scheduling based on only the simultaneous synchronization or the team synchronization. Further, in FIG. 20, by the statement "linking of task A and task B", means the generation of a task link file (i.e. file containing task linkage information) such as the one shown in FIG. 21. More specifically, FIG. 21 shows a task link file generated by applying the above-mentioned algorithm to the result of scheduling shown in FIG. 16. Besides, a processor file corresponding to the result of scheduling shown in FIG. 16 is also generated by the task scheduling means 5, as shown in FIG. 24. In this figure, symbol $S_0$ represents a simultaneous synchronization command. When the task link file shown in FIG. 21 is generated by the task scheduling means 5, the synchronization commands inserted between the linked tasks are deleted in the processor file shown in FIG. 24 by referring to the task link file. FIG. 23 shows a processor file thus obtained. It should however be understood that unless the task scheduling means 5 generates the task linking information, the synchronization information is not deleted. In FIG. 23, $S_0$ indicates the simultaneous synchronization. When the tasks are executed in accordance with the processor file shown in FIG. 23, the results are then such as shown in FIG. 17, from which it can be seen that the processing time is shortened by $\Delta T$ when compared with the processing time before the task linking.

As will be appreciated from the above description, the task scheduling means 5 receives as the inputs thereto information of the tasks, the task processing time and the inter-task relation to generate the result of task scheduling (block file), information about the tasks to be executed by the individual processors and the synchronization (processor file) and additionally the common variable table. Further, the task scheduling means 5 may generate the task linkage information (task link file). Among them, the processor file and the common variable table are supplied to the parallel compiling means 6 which in turn refers to the task registration table for translating the task synchronization instruction to the virtual machine code and additionally translating the virtual machine codes to the real machine codes with the aid of the virtual machine code-to-real machine code translation table.

As the result of this, there is generated a file (object program) in which the real machine codes to be executed by each processor are arrayed in the order of execution. This file or object program is supplied to the target machine 9, which then performs the parallel processing in accordance with the object program supplied thereto.

With the program parallelizing apparatus according to the instant (first) embodiment of the invention, a number of parts contained in the source program which are susceptible to the parallel processing can be parallelized by virtue of the division of the source program to the smaller units or tasks, wherein the tasks are parallelized such that the overall processing time involved in the parallel processing of the source program by the target machine can approach the minimum processing time realizable under the given conditions for the tasks, the task processing times and the inter-task sequential relations, there can be obtained the object codes as well as the sequence capable of being processed in parallel with a high processing efficiency to great advantage. Besides, because of the use of the scheduling algorithm adopting the concept of the level in the scheduling means 5, the scheduling can be carried out at an extremely high speed to another advantage. It is further noted that in the case of the program parallelizing apparatus according to the instant embodiment, the precompiling means 2, the task segmentation means 4 and the task scheduling means 5 are adapted to handle the virtual machine codes independently of the types of the processors of the multi-processor system. It is only the parallel compiling means 6 that is required to be modified in dependence on the real machine codes. Thus, the program parallelizing apparatus 10 according to the instant embodiment of the present invention can easily cope with the change or modification of the processors in the target machine 9 to further advantageous effect.

Second Embodiment

Figure 26:
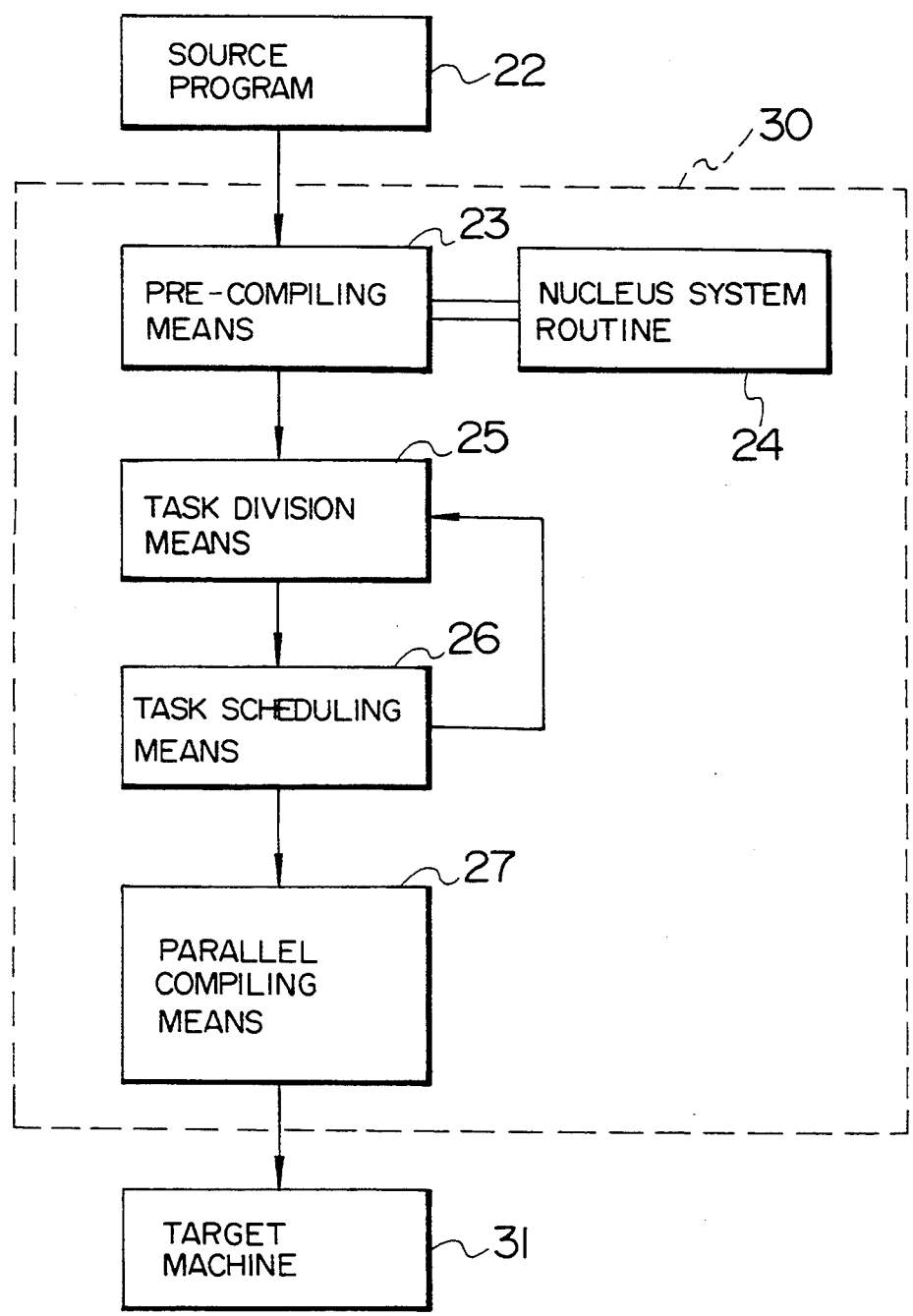
FIG. 26 is a schematic block diagram showing a general arrangement of the program parallelizing apparatus according to a second embodiment of the invention.

FIG. 26 is a schematic block diagram showing a general arrangement of the program parallelizing apparatus according to a second embodiment of the invention. As can be seen from this figure, the program parallelizing apparatus 30 according to the instant embodiment comprises a precompiling means 23, a nucleus system routine 24, a task division means 25, a task scheduling means 27.

A target machine 31 for executing the program from parallelizing apparatus 30 may be similar to the target machine 9 described hereinbefore in conjunction with the first embodiment of the invention.

The program parallelizing apparatus 30 according to the instant embodiment is essentially the same as that of the first embodiment so far as the precompiling of a source program 22 and the translation into virtual machine codes are concerned. The task division means 25 divides a group of virtual machine codes into individual tasks each corresponding to one virtual machine code to thereby generate a task registration table and a task relation table by a method similar to that described hereinbefore in conjunction with the first embodiment and supplies information about the tasks, the task processing times and the inter-task relations to the task scheduling means 26, which in turn parallelizes the tasks on the basis of the information of the task, the task processing times and the inter-task relation supplied from the task division means 25 while maintaining the inter-task sequential relation so that the overall time involved in the parallel processing of the given tasks by the target machine 31, including a plurality of processors, can approach the minimum processing time (processing time scaled along the critical path) which can be achieved under the given conditions of tasks, task processing time and the inter-task sequential relation, as in the case of the first embodiment.

Because the task scheduling means 26 adopts the method similar to that of the first embodiment, the tables and the files generated and outputted by this means 26 are similar to those of the first embodiment.

More specifically, the task scheduling means 26 outputs task linkage information (i.e. a task link file).

The task linkage information is supplied to the task division means 25 which regenerates the tasks on the basis of the task linkage information. In other words, those tasks which are indicated to be linked together in the task link file are linked into one task for linking tasks $GT_1$ to $T_n$ in this order into a task NT, there are performed procedures or manipulations (1) and (2) mentioned below.

1) In the task registration table, the task contents (virtual machine codes) of the task NT are registered as $OP_1, OP_2, \ldots, OP_n$ (where $OP_i$ is a virtual machine code of the task $T_i$) while the task processing time TPT (NT) of the task NT is registered as $$TPT(NT) = \sum_{i=1}^{n} TPT(T_i)$$

where TPT ($T_i$) represents the time required for processing the task $T_i$.

2) In the inter-task relation table:

i) In case the inter-task relation is indicated by the ascender tasks, those of $AT(T_1), AT(T_2), \ldots, AT(T_n)$ except $T_1, T_2, \ldots, T_n$ are registered in the inter-task relation table as the ascendent tasks of the task NT. (Note that $AT(T_i)$ represents the ascendent task of the task $T_i$.)

ii) In case the inter-task relation is indicated by the descendent tasks, those of $DT(T_1), DT(T_2), \ldots, DT(T_n)$ except $T_1, T_2, \ldots, T_n$ are registered in the inter-task relation table as the descendent tasks of the task NT. (Note that $DT(T_i)$ represents the descendent task of the task $T_i$.)

iii) In case the inter-task relation is indicated by both the ascendent tasks and the descendent tasks, those of $AT(T_1), AT(T_2), \ldots, AT(T_n)$ except $T_1, T_2, \ldots, T_n$ are registered in the inter-task relation table as the ascendent tasks of the task NT while those of $DT(T_1), DT(T_2), \ldots, DT(T_n)$ except $T_1, T_2, \ldots, T_n$ are registered in the inter-task relation table as the descendent tasks of the task NT.

By modifying the task registration table and the inter-task relation table in the manner mentioned above, the tasks are regenerated, whereon the task processing time information and the inter-task relation information are sent to the task scheduling means 26 to be scheduled in accordance with algorithm similar to that described previously so that the overall processing time can approach the critical path processing time as closely as possible.

The task scheduling, the task linking and the task regeneration are repeated in the manner described above. At the time when the overall processing time inclusive of parallel processing overhead can no more be shortened, the abovementioned repetition is stopped, whereon the processor file and the common variable table generated by the task scheduling means 26 at that time point are supplied to the parallel compiling means 27. Subsequent operations inclusive of that of the parallel compiling means 27 are similar to those of the first embodiment.

Advantageous effects brought about by the program parallelizing apparatus according to the instant (second) embodiment are mentioned below.

In general, when a source program is divided or segmented to a plurality of tasks which are then scheduled for allowing the parallel processing thereof so that the overall processing time can be diminished to a possible minimum, it is preferred to segment the source program into the task of as small a size as possible to thereby increase the number of the tasks susceptible to the parallel processing, provided that overhead (such as synchronization overhead and others) involved in the parallel processing is null. However, in the actual parallel processing system, since overhead involved in the parallel processing is inevitable, segmentation of the source program into the tasks of excessively small size will increase the number of operations such as synchronization processings, communications and others which increase overhead in the parallel processing, resulting in the overall processing time inclusive of parallel processing overhead being increased, rather than being reduced. However, by using the program parallelizing apparatus according to the instant embodiment of the invention in which the tasks are disassembled to minimum units to be scheduled for the parallelization, there can first be obtained the optimal result of scheduling on the assumption that the parallel processing overhead is null. Then, the size or magnitude (processing time) of each task is increased by linking and regeneration of the task so far as the overall processing time is not thereby increased on the assumption that the parallel processing overhead is null, which is then followed by repetition of scheduling for the parallelization. By virtue of this feature, the overall processing time inclusive of overhead involved in the parallel processing can significantly be reduced to great advantage.

Further, in the program parallelizing apparatus according to the instant embodiment, it is only the parallel compiling means 27 that is required to be modified in accordance with the real machine codes. Consequently, the program parallelizing apparatus 30 according to the second embodiment of the invention can easily cope with changes of the processors in the target machine 31.

Third Embodiment

Figure 27:
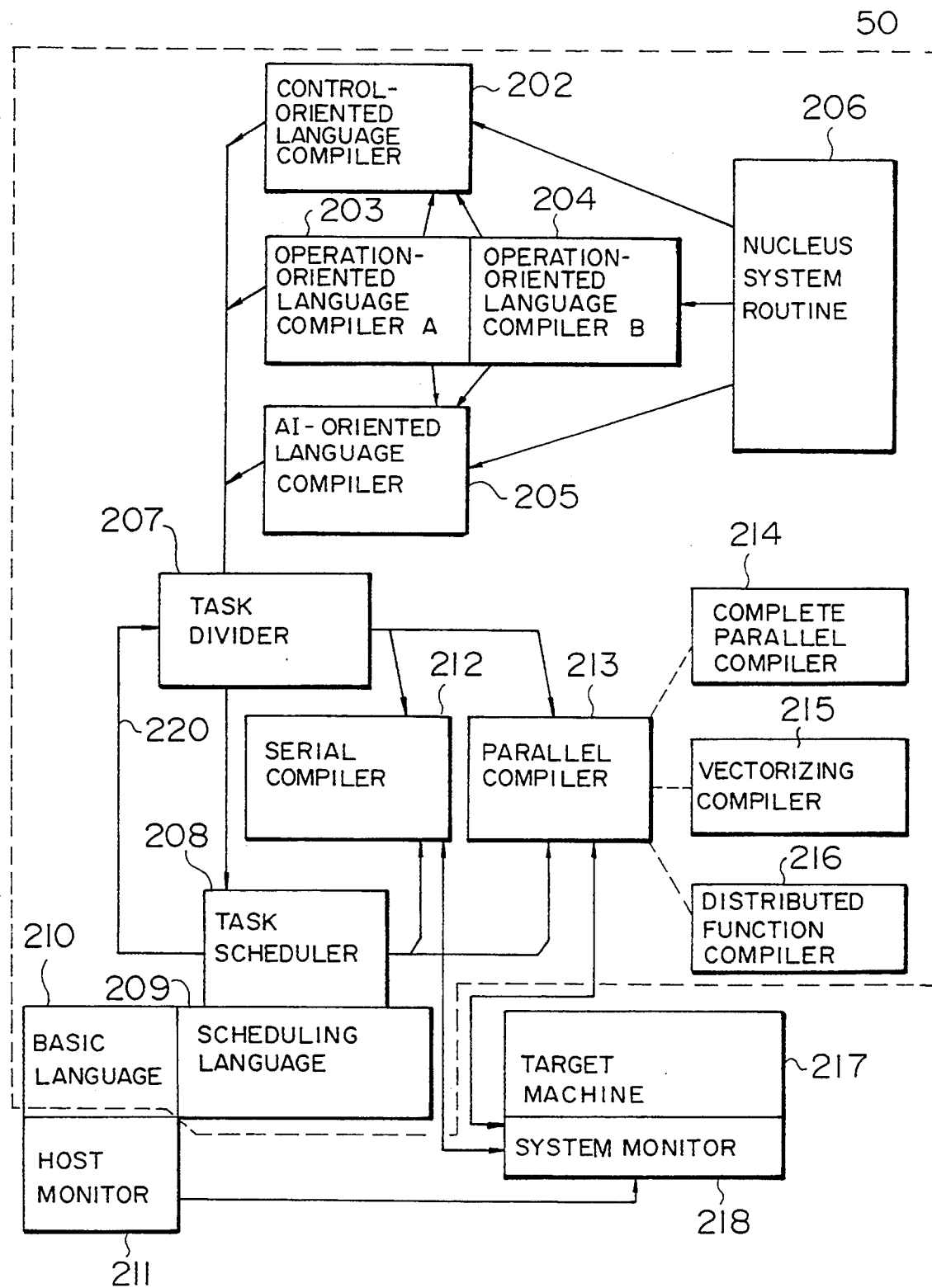
FIG. 27 is a diagram showing a third embodiment of the present invention.

FIG. 27 is a diagram showing a third embodiment of the present invention. The program parallelizing apparatus 219 according to the instant embodiment comprises a control-oriented language compiler 202, a nucleus system routine (nucleus language) 206, a task divider 207, a task scheduler 208, and a parallel compiler 213 and may further include, as occasion requires, an operation-oriented language compiler A 203, another operation-oriented language compiler B 204 and an AI-oriented language compiler 205. Besides, a serial compiler 212 may further be provided. As the parallel compiler 213, there must be provided at least one of a complete parallel compiler, a vectoring compiler 215 and a distributed function compiler 216.

A target machine 217 for executing the program parallelization frame the program parallelizing apparatus 219 according to the instant embodiment may be similar to the target machine 9 of the first embodiment. The target machine 217 can be monitored with the aid of a system monitor 218 and a host monitor 211. The task scheduler 208 is described by using a scheduling language 209 oriented for process management and BASIC language 210. A source program described in a control-oriented language is translated into virtual machine codes by the control-oriented language compiler 202 in accordance with a virtual machine code prescribed by the nucleus system routine (nucleus language) 206. Similarly, a source program described in an operation-oriented language A is translated correspondingly by the operation-oriented language compiler A 203, a source program written in an operation-oriented language B is translated by the operation-oriented language compiler B 204 and a source program described in an AI-oriented language is translated by the AI-oriented language compiler 205 into the virtual machine codes in accordance with prescriptions of the nucleus system routine (nucleus language) 206, respectively, when there is absent a path 220 from the task scheduler 208 to the task divider 207, the latter operates similarly to the task division means 4 described hereinbefore in conjunction with the first embodiment, while the task scheduler 208 operates similarly to the task scheduling means 5 of the first embodiment. Further, when the parallel compiler 213 includes the complete parallelize compiler 214 and when the latter function is selected, the parallel compiler 213 operates similarly to the parallel compiling means 6 of the first embodiment.

The object codes and the sequence now susceptible to the parallel processing with a high efficiency through the procedures and processings mentioned above are sent from the parallel compiler 213 to the target machine 217 where the parallel processing is executed.

When the parallel compiler 213 includes the vectoring compiler 215 and when the function of the latter is selected, the processor file and the common variable table supplied from the task scheduler 208 to the parallel compiler 213 are translated to vectored real machine codes and sequence by the parallel compiler 213 so that the target machine 217 can perform the vector processing correspondingly.

When the parallel compiler 213 includes the distributed function compiler 216 and when this function is selected, the parallel compiler 213 translates the processor file and the common variable table sent from the task scheduler 208 into real machine codes and sequence so that the distributed function processing can be performed by the target machine 217. The real machine codes and sequence resulting from the above translation are supplied to the target machine 217 which then performs the distributed function processing correspondingly.

When the target machine is to perform a serial processing, the serial compiler 212 generates real machine codes and sequence oriented for serial processing on the basis of the processor file outputted for the serial processing from the task scheduler 208. The generated codes and sequence are then sent to the target machine.

It should be mentioned that when the serial processing or the distributed function processing is performed, the task information and the inter-task relation information may be sent to the serial compiler 212 and the parallel compiler 213 from the task divider 207 without the intervention of the task scheduler 208.

On the other hand, when there exists the path 220 from the task scheduler 208 to the task divider 207, the latter can operate similarly to the task division means 25 of the second embodiment of the invention, while the task scheduler 208 operates similarly to the task scheduling means 26 of the second embodiment. Other operations are substantially same as described above on the assumption that the path 220 is absent.

The program parallelizing apparatus according to the instant embodiment can enjoy the advantages mentioned below in addition to those of the first and second embodiments.

The program parallelizing apparatus can cope with a plurality of languages such as the control-oriented language, operation-oriented languages A and B, and the AI-oriented language as well as the serial processing performed by the target machine. Besides, the program parallelizing apparatus according to the instant embodiment allows the target machine to perform the vector processing and the distributed function processing.

Fourth Embodiment

FIG. 28 is a block diagram showing a general arrangement of the program parallelizing apparatus according to a fourth embodiment of the invention. This program parallelizing apparatus 70 includes an information processing unit 111 and a storage unit 112 and is connected to a target machine denoted generally by 73 through an interface 71.

Programs describing the algorithm employed in the program parallelizing apparatus as described hereinbefore in conjunction with the first to third embodiments of the invention are stored in the storage or memory 112 incorporated in the program parallelizing apparatus 70. The object codes and sequence made susceptible to the parallel processing by the target machine 73 as the result of execution of an algorithm by the information processing unit 111 are sent to the target machine 73 through an interface 71 and an externally extended channel 97. In the case of the instant embodiment, it is assumed that the target machine 73 is constituted by a parallel processing apparatus disclosed in JP-A-63-101957.

Figure 29:
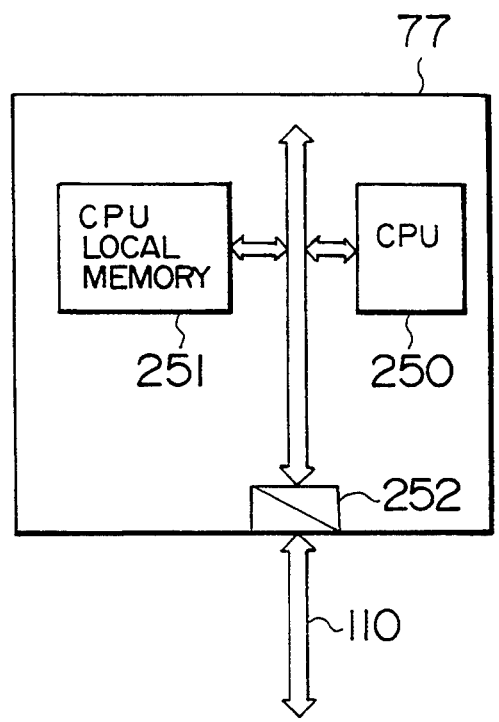
FIG. 29 is a schematic diagram showing a structure of a processor (77-82) incorporated in a target machine.

By using the externally extended channel 97, the program parallelizing apparatus 70 can directly make access to shared memories 106 to 108, which in turn means that the object codes as well as the sequence (object program) generated by the program parallelizing can be sent to the shared memories 106 to 108, whereby the processors 77 to 82 can execute processings in parallel correspondingly under the control of parallel processing mechanisms 87 to 92, respectively. Communication among the processors 77 to 82 is achieved by using the shared memories 106 to 108 connected individually to the processors 77 to 82 through a bus to which signal control circuits 93 to 96 can make random access at a high speed with high efficiency, as described hereinbefore in conjunction with the first embodiment. Even when the number of the processors incorporated in the target machine 73 differs from the instant embodiment shown in FIG. 28, similar operations and effects can be ensured. Each off the processors 77 to 82 includes a CPU (Central Processing Unit) 250, a CPU local memory 251 and a buffer 252, as shown in FIG. 29. Accordingly, the information off the object codes and sequences to be executed by the individual processors may be stored in the CPU local memories of the processors in place of the shared memories 106 and 107. It is further noted that by using externally extended channels 84 to 86, the object codes and sequence generated by the program parallelizing apparatus 70 according to the instant embodiment can be supplied to the target machine 73.

The program parallelizing apparatus 70 according to the instant embodiment may be implemented by using, for example, a personal computer, a work station or the like singularly or in multiplicity. Further, a single on plural ones off the processors incorporated in the target machine may be used as the program parallelizing apparatus 70.

The program parallelizing apparatus according to the instant (Fourth) embodiment off the invention provides an advantage that object codes and sequence for allowing the target machine 73 to perform the parallel processing with high efficiency can be obtained in addition to those of the first to third embodiments.

What is claimed is:

1. A computerized parallelizing apparatus for converting a source program into object programs susceptible to parallel processing by a multi-processor system having a plurality of processors, said parallelizing apparatus comprising:

pre-compiling means within a computer for converting a source program into intermediate codes;

dividing means within the computer and coupled to said pre-compiling means for dividing the intermediate codes into a plurality of tasks, each task having a task size of at least one intermediate code;

generating means within the computer and coupled to said dividing means for generating relation information indicative of task sequential relationships among the plurality of tasks on the basis of operand data in the tasks;

distributing means within the computer and coupled to said generating means for distributing the plurality of tasks to a plurality of levels obtained by dividing a total processing time by synchronizing time points in a time sequential order;

assigning means within the computer and coupled to said distributing means for assigning tasks which are distributed at each of the levels to processors in the multi-processor system;

determining means within the computer for determining processing times of machine instructions constituting each of the tasks to generate processing time information indicative of the processing time for each of the tasks; and converting means for converting the tasks into object programs to be processed by the plurality of processors.

2. A computerized parallelizing apparatus for converting a source program into object programs susceptible to parallel processing by a multi-processor system having a plurality of processors, said parallelizing apparatus comprising:

pre-compiling means within a computer for converting source program into intermediate codes;

dividing means within the computer and coupled to said pre-compiling means for dividing the intermediate codes into a plurality of tasks;

generating means within the computer and coupled to said dividing means for generating relation information indicative of task sequential relationships among the plurality of tasks on the basis of operand data in the tasks;

distributing means within the computer and coupled to said generating means for distributing the plurality of tasks to a plurality of levels obtained by dividing a total processing time by synchronizing time points in a time sequential order;

assigning means within the computer and coupled to said distributing means for assigning tasks which are distributed at each of the levels to processors in the multi-processor system;

determining means within the computer for determining processing times of machine instructions constituting each of the tasks to generate processing time information indicative of the processing time for each of the tasks; and converting means for converting the tasks into object programs to be processed by the plurality of processors;

wherein said dividing means divides the intermediate codes such that each of the tasks assigned to each processor has a processing time sufficient to maintain a parallel processing efficiency related to task processing time and overhead requirement for parallel processing not less than a predetermined value.

3. A computerized parallelizing apparatus according to claim 2, wherein said dividing means divides the intermediate codes such that each of the tasks has a size of at least one virtual machine code.

4. A computerized parallelizing apparatus according to claim 3 further comprising linking means within the computer and coupled to said distributing means and said determining means for linking tasks distributed at different levels, said linking means generating task linkage information for all the tasks distributed by said distributing means so as to link tasks such that processing time after linking is not longer than processing time before linking.

5. A computerized parallelizing apparatus according to claim 4, further comprising means within the computer and coupled to said linking means for re-distributing and reassigning tasks to each of said processors after linking of tasks by said linking means.

6. A computerized parallelizing apparatus according to claim 2, further comprising linking means within the computer and coupled to said distributing means and said determining means for linking tasks distributed at different levels, said linking means generating task linkage information for all the tasks distributed by said distributing means so as to link tasks such that processing time after linking is not longer than processing time before linking.

7. A computerized parallelizing apparatus for converting a source program into object programs susceptible to parallel processing by a multi-processor system having a plurality of processors, said parallelizing apparatus comprising:

pre-compiling means within a computer for converting a source program into intermediate codes;

dividing means within the computer and coupled to said pre-compiling means for dividing the intermediate codes into a plurality of tasks, each task having a task size of at least one intermediate code;

generating means within the computer and coupled to said dividing means for generating relation information indicative of task sequential relationships among the plurality of tasks on the basis of operand data in the tasks;

distributing means within the computer and coupled to said generating means for distributing the plurality of tasks to a plurality of levels obtained by dividing a total processing time by synchronizing time points in a time sequential order;

assigning means within the computer and coupled to said distributing means for assigning tasks which are distributed at each of the levels to processors in the multi-processor system;

determining means within the computer for determining processing times of machine instructions constituting each of the tasks to generate processing time information indicative of the processing time for each of the tasks;

linking means within the computer and coupled to said distributing means and said determining means for linking tasks distributed at different levels, said linking means generating task linkage information for all the tasks distributed by said distributing means so as to link tasks such that processing time after linking is not longer than processing time before linking; and converting means for converting the tasks into object programs to be processed by the plurality of processors.

8. A computerized parallelizing apparatus according to claim 7, further comprising means within the computer and coupled to said linking means for re-distributing and reassigning tasks to each of said processors after linking of tasks by said linking means.

9. A method of compiling a source program into object programs susceptible to parallel processing by a multi-processor system having a plurality of processors, said method performed by a computer with compiler software that controls operation of the computer, said method comprising the steps of:

(a) converting a source into intermediate codes;

(b) dividing the intermediate codes into a plurality of tasks;

(c) generating relation information indicative of task sequential relationships among the plurality of tasks on the basis of operand data in the tasks;

(d) distributing the plurality of tasks to a plurality of levels obtained by dividing a total processing time by synchronizing time points in a time sequential order;

(e) assigning tasks which are distributed at each of the levels to processors in the multi-processor system;

(f) determining processing times of machine instructions constituting each of the tasks to generate processing time information indicative of the processing time for each of the tasks; and (g) converting the tasks into object programs to be processed by the plurality of processors.

* * * * *